United States Patent
Arnold et al.

(10) Patent No.: US 12,276,593 B2
(45) Date of Patent: Apr. 15, 2025

(54) OPTICAL TRAP USING A FOCUSED HOLLOW BEAM OF UNEQUAL AXISYMMETRY AND NO ANGULAR MOMENTUM FOR TRAPPING AND ROTATING AIRBORNE PARTICLES

(71) Applicant: U.S. Army DEVCOM, Army Research Laboratory, Adelphi, MD (US)

(72) Inventors: Jessica A. Arnold, Chevy Chase, MD (US); Aimable Kalume, Adelphi, MD (US); Yongle Pan, Ellicott City, MD (US); Gorden Videen, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 142 days.

(21) Appl. No.: 17/694,326

(22) Filed: Mar. 14, 2022

(65) Prior Publication Data
US 2023/0314299 A1 Oct. 5, 2023

(51) Int. Cl.
*G01N 15/1434* (2024.01)
*G01N 15/14* (2024.01)
*G21K 1/00* (2006.01)

(52) U.S. Cl.
CPC ......... *G01N 15/1434* (2013.01); *G21K 1/006* (2013.01); *G01N 2015/1445* (2013.01);
(Continued)

(58) Field of Classification Search
None
See application file for complete search history.

(56) References Cited

U.S. PATENT DOCUMENTS 4,893,886 A * 1/1990 Ashkin ............... G01N 15/10
359/350
6,180,940 B1 * 1/2001 Galstian ............... G21K 1/006
250/251
(Continued)

FOREIGN PATENT DOCUMENTS

CN 111029903 A * 4/2020 ......... H01S 5/18347

OTHER PUBLICATIONS

Cai, Yanan, et al. "Rapid tilted-plane Gerchberg-Saxton algorithm for holographic optical tweezers." Optics Express 28.9 (2020): 12729-12739. (Year: 2020).*
(Continued)

*Primary Examiner* — Rufus L Phillips
(74) *Attorney, Agent, or Firm* — Eric B. Compton

(57) ABSTRACT

Systems and methods for trapping and holding airborne particles using an orienting hollow beam are disclosed. In the various embodiments, an optical trap comprises: a light source for generating a beam of light; optics and/or mechanics for forming and shaping the beam of light into an orienting hollow beam having unequal axisymmetry with a substantially hollow ring geometry cross-section and no angular momentum; an optical focusing element for focusing the orienting hollow beam; and a trapping region where an airborne particle can be present to be trapped and held at or near a focal point of the focused optical focusing element. In this arrangement, the particle is trapped at or near the focal point of the focused orienting hollow beam. In this arrangement, the particle is trapped at or near the focal point of the focused orienting hollow beam. The orienting hollow beam may be made rotatable in some embodiments.

23 Claims, 11 Drawing Sheets

(52) U.S. Cl.
CPC .............. *G01N 2015/1493* (2013.01); *G01N 2015/1497* (2013.01)

(56) References Cited

U.S. PATENT DOCUMENTS

| | | | |
|---|---|---|---|
| 6,947,134 | B2 | 9/2005 | Chang et al. |
| 7,410,063 | B1 | 8/2008 | Chang |
| 8,830,476 | B2 | 9/2014 | Berg et al. |
| 9,222,874 | B2 | 12/2015 | Hill et al. |
| 9,443,631 | B1 | 9/2016 | Pan et al. |
| 9,448,155 | B2 | 9/2016 | Pan |
| 11,016,280 | B1 | 5/2021 | Pan et al. |
| 2003/0179386 | A1* | 9/2003 | Santamato ............ G21K 1/006 356/614 |
| 2007/0146714 | A1* | 6/2007 | Mohanty ............... G21K 1/006 356/432 |
| 2022/0215980 | A1* | 7/2022 | Wang ...................... G02B 21/32 |

OTHER PUBLICATIONS

"Acylindrical Lenses" webpage, Thorlabs, Copyright @ 1999-2022, available at: https://www.thorlabs.com/newgrouppage9.cfm?objectgroup_ID=5931.

Xiahui Zeng and Fengtie Wu, "Effect of elliptical manufacture error of an axicon on the diffraction-free beam patterns," Optical Engineering, 47(8), 083401 (2008).

"Holographic Diffusers" webpage, Edmund Optics Inc., Copyright 2022, available at: https://www.edmundoptics.com/f/holographic-diffusers/11481/.

Jingtao Dong, "Line-scanning laser scattering system for fast defect inspection of a large aperture surface," Appl. Opt. 56, 7089-7098 (2017).

"SLM Pattern Generator" webpage, Holoeye Photonics AG. © 2022, available at: https://holoeye.com/spatial-light-modulators/slm-software/slm-pattern-generator/.

Rijuparna Chakraborty and Ajay Ghosh, "Generation of an elliptic hollow beam using Mathieu and Bessel functions," J. Opt. Soc. Am. A 23, 2278-2282 (2006).

A. A. Kovalev et al., "A highly efficient element for generating elliptic perfect optical vortices," Appl. Phys. Lett. 110, 261102 (2017).

Yangjian Cai et al., "An alternative theoretical model for an anomalous hollow beam," Opt. Express 16, 15254-15267 (2008).

"LC 2012 Spatial Light Modulator (transmissive)" webpage, Holoeye Photonics AG. @ 2022, available at: https://holoeye.com/lc-2012-spatial-light-modulator/.

Carlos Loxpez-Mariscal et al., "Orbital angular momentum transfer in helical Mathieu beams," Opt. Express 14, 4182-4187 (2006).

Rijuparna Chakraborty and Ajay Ghosh, "Generation of an elliptic Bessel beam," Opt. Lett. 31, 38-40 (2006).

Huirong Li and Jianping Yin, "Generation of a vectorial elliptic hollow beam by an elliptic hollow fiber," Opt. Lett. 36, 457-459 (2011).

Huirong Li and Jianping Yin, "Generation of a vectorial Mathieu-like hollow beam with a periodically rotated polarization property," Opt. Lett. 36, 1755-1757 (2011).

Miguel A. Bandres and Julio C. Gutierrez-Vega, "Elliptical beams," Opt. Express 16, 21087-21092 (2008).

Gutierrez-Vega, Julio C., "Advances in Information Optics and Photonics," Chapter 3: Characterization of Elliptic Dark Hollow Beams, 2008 (Abstract).

R. Hernandez et al. "Experimental generation of Mathieu-Gauss beams with a phase-only spatial light modulator." Applied optics 49 36 (2010): 6903-9.

Brandon Redding and Yong-Le Pan, "Optical trap for both transparent and absorbing particles in air using a single shaped laser beam," Opt. Lett. 40, 2798-2801 (2015).

Jessica A. Arnold, Aimable Kalume, Chuji Wang, Gorden Videen, and Yong-Le Pan, "Active, controlled circular, and spin-rotational movement of optically trapped airborne micro-particles," Opt. Lett. 46, 5332-5335 (2021).

Jessica Arnold, Aimable Kalume, Gorden Videen, Yong-Le Pan, Chuji Wang, Presentation titled "Methods for Optical Trapping and Active Orientation Control of Airborne Microparticles," American Association for Aerosol Research 2021 conference, Oct. 20, 2021.

D. D. Dabrowska, et al., "Scattering Matrices of Martian Dust Analogs at 488 nm and 647 nm," Icarus, 250, 83-94, 2015.

R.G. Pinnick et al., "Fluorescence spectra of atmospheric aerosol at Adelphi, Maryland, USA: measurement and classification of single particles containing organic carbon," Atmos. Environ., 38, 657-1672 (2004).

Y.L. Pan et al., "Single-particle laser-induced fluorescence spectra of biological and other organic-carbon aerosols in the atmosphere: measurements at New Haven, Connecticut, and Las Cruces, New Mexico," J. Geophys. Res., 112, D24S19, 1-15 (2007).

Y. L. Pan et al., "Fluorescence spectra of atmospheric aerosol particles measured using one or two excitation wavelengths: Comparison of classification schemes employing different emission and scattering results," Optics Express, 18(12), 12436-12457 (2010).

U.S. Appl. No. 17/027,131 filed Sep. 21, 2020.

* cited by examiner

FEHB
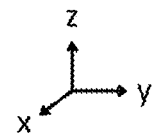
Isometric View
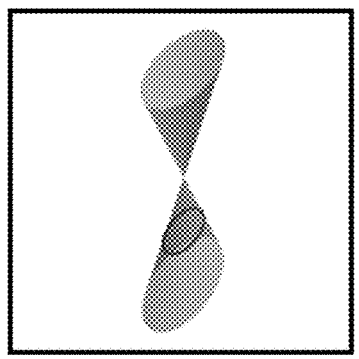
FIG. 7A
Side view long axis
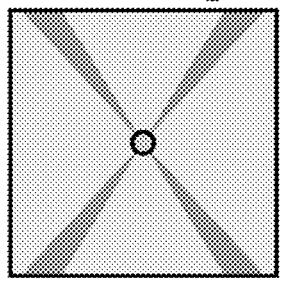
Side view short axis
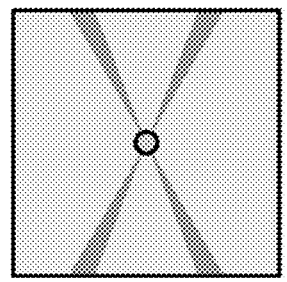
Top view
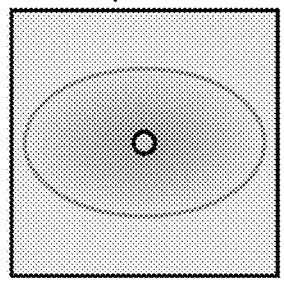
FIG. 7B
FIG. 7C
FIG. 7D

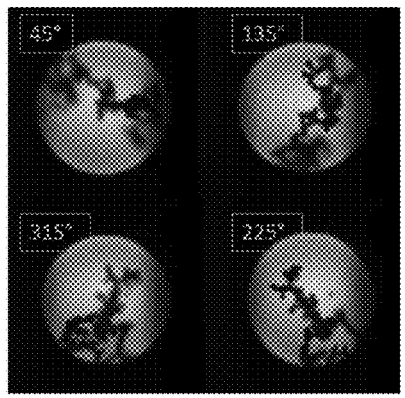
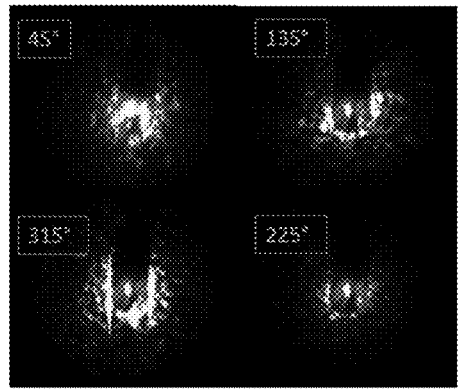
FIG. 12A                FIG. 12B
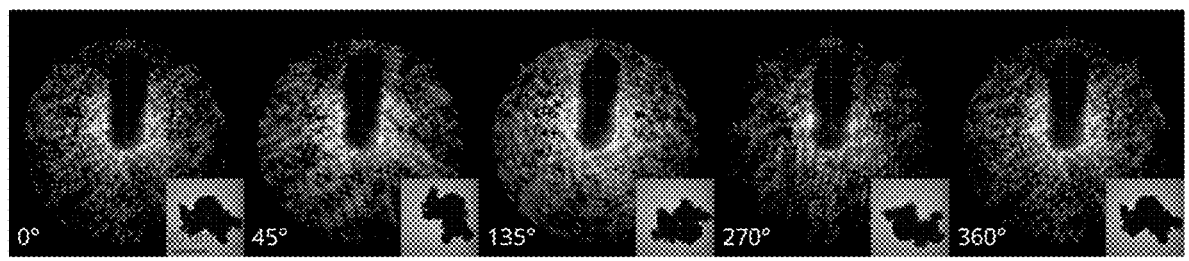
FIG. 13

OPTICAL TRAP USING A FOCUSED HOLLOW BEAM OF UNEQUAL AXISYMMETRY AND NO ANGULAR MOMENTUM FOR TRAPPING AND ROTATING AIRBORNE PARTICLES

GOVERNMENT INTEREST

The invention described herein may be manufactured, used and licensed by or for the U.S. Government without the payment of royalties thereon.

Some of the research underlying the invention was supported by the U.S. Development Capabilities Command Army Research Laboratory (ARL) under Defense Threat Reduction Agency (DTRA) Contract No. HDTRA1-17-D0002.

BACKGROUND OF THE INVENTION

Field

Embodiments of the present invention are generally directed to trapping and holding airborne particles, and more particularly, to optical traps which use a focused hollow beam unequal axisymmetry and no angular momentum for trapping, holding, and manipulating the orientations of airborne particles. The orienting hollow beam is made rotatable in some embodiments.

Description of Related Art

Optical trapping is an important and widely used technique for trapping and measuring small airborne particles. Improved optical trap designs have allowed a large variety of both optically absorbing and non-absorbing micro-particles to be isolated for various analytical techniques. Due to the complex shapes, varied sizes, and compositional inhomogeneity of aerosols, retrieval of their chemical and physical properties needs to take into account the orientation of the particles relative to the light source and instrument detector.

To adequately measure and characterize many chemically inhomogeneous particles require measurement techniques with high-spatial resolution spectroscopy that use scattering light, for instance, like Raman spectroscopy. However, measurements and identification on particles based on light scattering are generally limited by the fact that light scattering signals are dependent on aerosol particle orientation.

Methods have been developed to trap and rotate particles suspended in liquid. These were carried out using circularly or elliptically polarized light, dual beams, optical fibers, and shaped beams, including beam shapes generated by computer-generated holography. Applications for these liquid-particle systems include measuring fluid viscosity, manipulating and observing single red blood cells for disease diagnosis, and even malaria diagnosis. However, when developing techniques for real-time detection and identification of biological or chemical aerosols, it is advantageous to study airborne particles directly. Also, the higher viscosity of liquid versus air slows the particle's dynamic response to external changes in experimental conditions, limiting direct study of particle motion due to changes in optical forces.

The apparatuses known to us which manipulate airborne particles have primarily focused on periodic circular motion of trapped particles. In these apparatuses, the observed rotational motion was a consequence of combined angular momentum and forces applied on the trapped particle, and the rotational periodicity is dependent on fixed properties including the particle shape, absorptivity, and laser beam configuration/power.

In light of the foregoing, improvements are desired.

BRIEF SUMMARY OF THE INVENTION

Embodiments of the present invention are directed to devices, systems and methods for trapping and holding airborne particles. In the various embodiments, an optical trap is provided which uses an orienting hollow beam having unequal axisymmetry with a substantially hollow ring geometry cross-section and no angular momentum for trapping and holding airborne particles. The orienting hollow beam may be made rotatable.

According to embodiments, an optical trap for trapping and holding airborne particles comprises: a light source for generating a beam of light; optics and/or mechanics for forming and shaping the beam of light into an orienting hollow beam having unequal axisymmetry with a substantially hollow ring geometry cross-section and no angular momentum; an optical focusing element for focusing the orienting hollow beam; and a trapping region where an airborne particle can be present to be trapped and held at or near a focal point of the focused optical focusing element. In this arrangement, the particle is trapped at or near the focal point of the focused orienting hollow beam.

The optical trap may further comprise a rotating means for rotating the orienting hollow beam with respect to the optical axis of trap. For instance, in some embodiments, the rotating means may be a rotational stage for supporting and rotating at least one optical element of the optics and/or mechanics for forming and shaping the orienting hollow beam. Or the rotating means may be provided via holography in other embodiments. For instance, the CGH may be programmed to rotate the image on the SLM thus, not only providing the optics and/or mechanics for forming and shaping the orienting hollow beam, but also providing the rotating means. As a non-limiting example, the rotating means rotates at a controlled angular speed between 1-8 degrees per second. Advantageously, the rotating means can be stopped or paused to hold the focal point of the hollow cone at any given angular orientation of the semi-major axis of the orienting hollow beam cone in the trapping region. The speed and direction of rotation can be varied too. Thus, in this embodiment, the rotating means may be configured to (i) start rotating in order to impart rotation to a trapped particle; (ii) change speed in order to alter the rotation (such as speed up or slow down the speed) of a trapped particle; (iii) stop or pause rotation in order to hold a trapped particle at a given angular orientation; and/or (iv) reverse the direction of rotation to change the rotational direction of a trapped particle. Additionally, the optical trap may be configured to provide a spin-rotational motion to a trapped particle at laser power level less than about 1.5 W and a circular-rotational motion to a trapped particle at laser power greater than about 1.5 W.

The optics and/or mechanics for forming and shaping the beam of light into an orienting hollow beam may include one or more optical elements, holographic means, or a combination thereof. In some embodiments and implementations, the optics and/or mechanics for forming and shaping the beam of light into the orienting hollow beam include a first means for forming shaping an intermediate beam from the beam of light, and a second means for forming and shaping the orienting hollow beam from the intermediate beam. For instance, the intermediate beam may comprise a cylindrical hollow beam, and the orienting hollow beam may comprise an elliptical hollow beam in some embodiments. The first means for forming and shaping the intermediate hollow beam from the beam of light may comprise: a cylindrical lens, acylindrical lens, non-circular axicons, deforming mirrors, elliptical holographic diffusers, or anamorphic prism pairs. And the second means for forming the orienting hollow beam from the intermediate beam may comprise: one or more optical elements, a spatial light modulator (SLM) configured to generate a computer-generated hologram (CGH) image of the orienting hollow beam, or a combination thereof as non-limiting examples. The CGH may be programmed to rotate the image on the SLM, thus also providing the rotating means.

In some embodiments, the optics and/or mechanics for forming and shaping the beam of light the orienting hollow beam directly form it from the beam of light. They may include a spatial light modulator (SLM) configured to generate a computer-generated hologram (CGH) image of the orienting hollow beam directly from the beam of light. The CGH may be programmed to rotate the image on the SLM, thus also providing the rotating means.

The optical focusing element may include a lens, a parabolic reflector or a microscopic objective. For instance, the lens may be an aspheric lens. Additionally, the optical trap may further include an imaging and/or measuring system configured to image particles in the trapping region. The imaging system may comprise a charge-coupled device (CCD) or camera, for example, for capturing still images and video footage. The measuring system may include a device, detector or instrument for measuring particles and/or their properties.

The light source may comprises a laser, a light emitting diode (LED), or other light source with a narrow wavelength band or a broad wavelength band either in continuous wave (CW) or pulsed output beam. In some instances, the optical trap may further comprise an iris for controlling the diameter of the coherent beam of light and/or collimating optics.

The trapping region may be located within a containment cell, for instance. Also, the optical trap may comprise other optics, such as a mirror positioned between the optics and the optical focusing element for changing the direction of the orienting hollow beam. The optical focusing element may comprise a lens, an objective or a focusing mirror. It may have a numerical aperture (NA) less than or equal to 0.95, for example. In accordance with the embodiments, the NA of the focusing element should be lower than required for that of a traditional optical trap or laser tweezers. In one non-limiting embodiment, the optical focusing element may be an aspheric lens. The orienting hollow beam each include an outer annular region with a central opening or void of substantially no intensity.

The optical trap may further include a controller configured to control the trapping and holding of particles. The controller is configured to generate signals to: trap one or more airborne particles in the trapping region; image and/or measure one or more properties of the one or more trapped airborne particles; and release the one or more trapped airborne particles.

According to further embodiments, a particle detection and measuring system includes the aforementioned optical trap. In this system, the optical trap is generally configured to trap and hold only about one particle at any one time. Although, the trap could be configured to hold multiple particles if so desired. The particle detection and measuring system may further include one or more of the following: a particle detector configured to detect an airborne particle approaching and/or within the trapping region; at least one source configured to excite emissions of the trapped one or more airborne particles; a measurement device to measure at least one property of the trapped particle; a particle analyzer configured to determine, from the measured property, a parameter related to particle shape, size, internal structure, surface texture, refractive index, absorption, orientation, molecular structures and compositions, chemical reactions, or any combination thereof of the trapped one or more airborne particles; and/or a particle sorter configured to physically sort, and optionally store, particles based on their measured properties.

The measurement device may be judiciously configured to measure one or more of: imaging, Raman scattering spectra, Raman emission in one or more wavelength bands, laser-induced breakdown emission in one or more wavelength bands, laser-induced breakdown spectra, spark-induced breakdown emission in one or more wavelength bands, spark-induced breakdown spectra, fluorescence in one or more wavelength bands, fluorescence spectra, multiphoton excited fluorescence, thermal emission at one or more wavelengths, thermal emission spectra, or light scattering over one or more angles, light scattering at multiple wavelengths, absorption spectra of the particle, particle size and shape, cavity ringdown spectroscopy, and photoacoustic absorption spectra. In some implementations, the particle analyzer is configured to execute an algorithm which identifies or classifies particles into different categories based on their measured properties.

According to additional embodiments, there is a method for continuously sampling particles from air using the aforementioned particle detection and measuring system. The method comprises: continuously directing air including airborne particles toward a trapping region; detecting an airborne particle in the air approaching and/or within the trapping region; trapping one or more airborne particles in the optical trap; measuring a property of the trapped one or more airborne particles; and releasing the trapped one or more airborne particles. The method may further comprise rotating the one or more trapped particles to a first orientation; and subsequently rotating the one or more trapped particles to a second orientation. More, the method may also include determining from the measured property a parameter related to particle shape, size, refractive index, absorption, molecular structures and compositions, chemical reactions, or any combination thereof of the trapped one or more airborne particles.

According to yet another embodiment, an optical trap for trapping and holding airborne particles comprises: a light source for generating a beam of light; optics for shaping and forming a circular hollow beam having a circular ring geometry from the beam of light; a cylindrical lens for further shaping and forming the circular hollow beam into an elliptical hollow beam having an elliptical ring geometry; a rotation stage which support and rotates the cylindrical lens in a controlled manner; an optical focusing element for focusing the elliptical hollow beam into a hollow elliptical cone; and a trapping region where an airborne particle can be present to be trapped and held at or near a focal point of the hollow elliptical cone.

These and other embodiments of the invention are described in more detail, below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

FIGS. 7A-7D are views of a focused elliptical hollow beam in the trapping region.

FIGS. 12A and 12B are images and patterns that further demonstrate imaging and scattering patterns of a trapped particle at different orientations, respectively.

FIG. 13 shows elastic patterns from a single trapped aggregate and its corresponding images of this trapped particle at different orientations.

DETAILED DESCRIPTION

Figure 1:
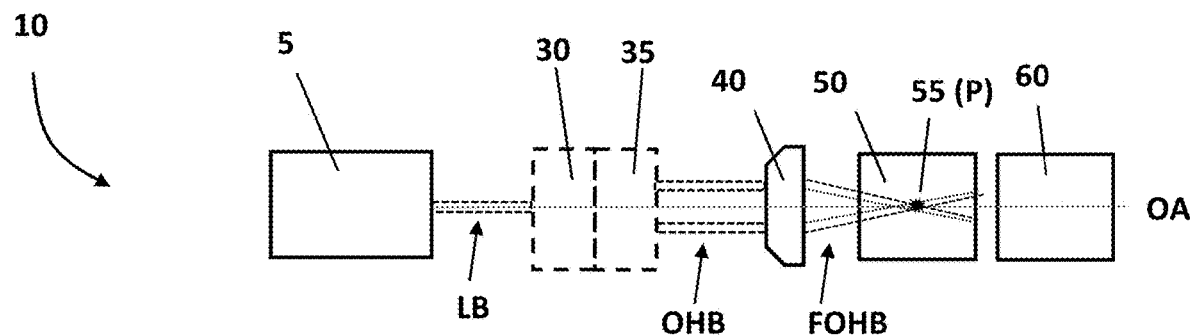
FIG. 1 is a schematic illustration of an optical trap for trapping particles according to embodiments of the present invention.

FIG. 1 is a schematic illustration of an optical trap 10 for trapping particles according to embodiments of the present invention. The optical trap 10 is formed of a light source 5 for generating a light beam LB. Optics and/or mechanics 30 form and shape the light beam LB light into an orienting hollow beam OHB having unequal axisymmetry with a substantially hollow ring geometry cross-section and no angular momentum (see FIG. 2). An optical focusing element 40 for focusing the orienting hollow beam; and a trapping region 50 where an airborne particle P can be present to be trapped and held at or near a focal point of the focused orienting hollow beam FOHB via the optical focusing element 40. As shown, the optical trap 10 includes an optional imaging and/or measuring device/system 60.

Figure 1A:
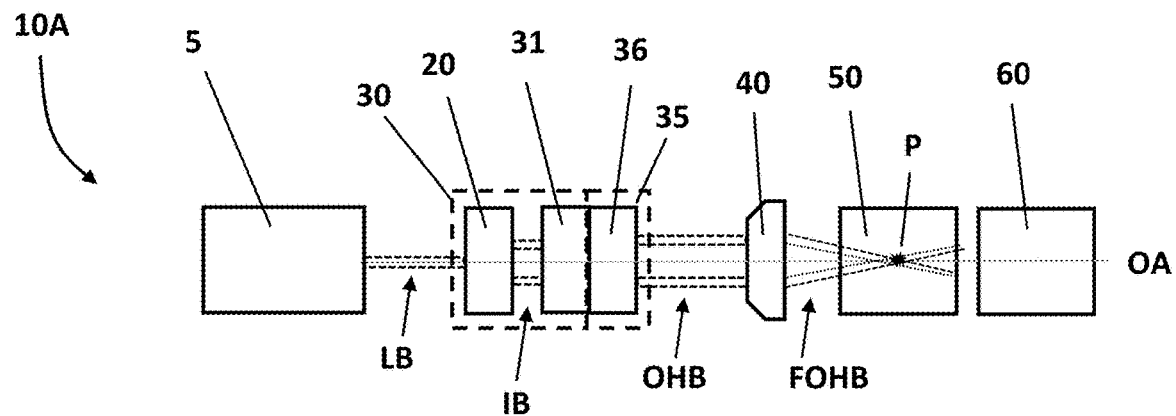
FIGS. 1A, 1B and 1C show schematic illustrations of optical traps according to more specific embodiments.
Figure 1B:
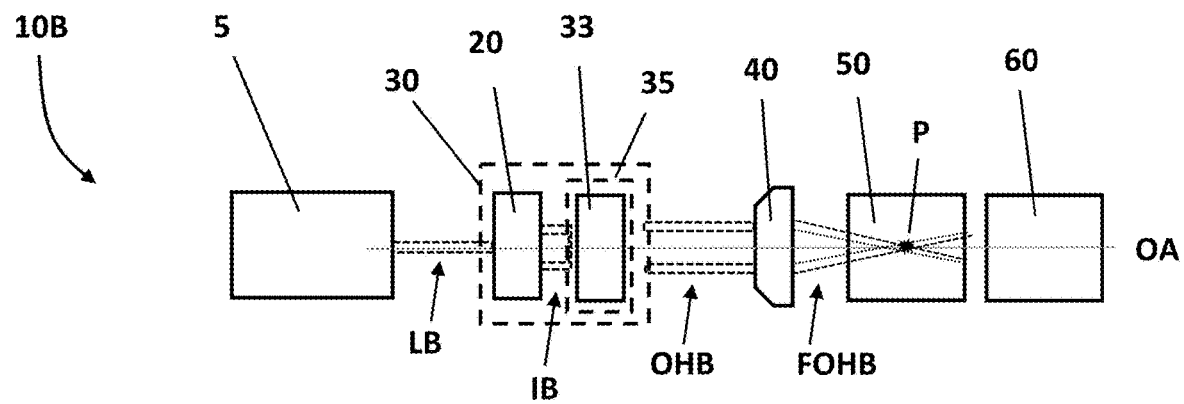
Figure 1C:
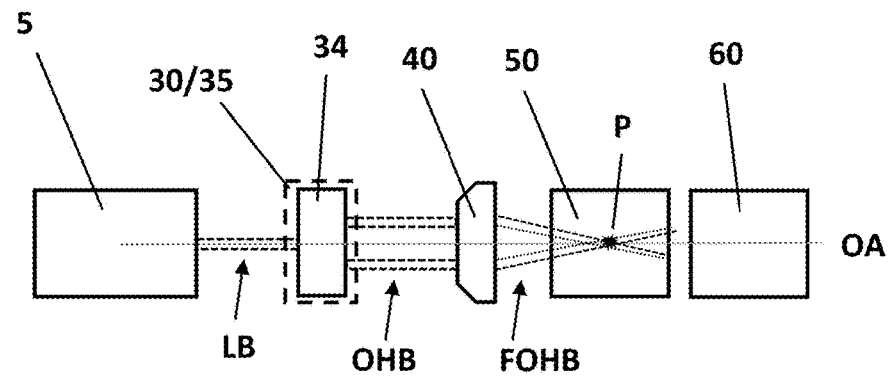

FIGS. 1A, 1B and 1C show schematic illustrations of optical traps 10A, 10B and 10C according to more specific embodiments. Many of the elements are the same and will not be further discussed in detail with respect to each figures.

The optical trap 10 may further include rotating means 35 for rotating the orienting hollow beam OHB with respect to the optical axis OA. In some embodiments, the rotating means 35 may be a separate element from the optics and/or mechanics 30 for forming and shaping the orienting hollow beam OHB. In other embodiments, the optics and/or mechanics 30 for forming and shaping the orienting hollow beam OHB also provides the rotation means 35; thus, there is no separate element for providing rotation.

In some embodiments, the orienting hollow beam OHB is formed of an intermediate beam IB. And multiple intermediate beams may be present in some embodiments. Additional optics may be used for forming and shaping the intermediate beam, if present.

The innovative optical trap 10 is formed by a single beam of light from the light source 5. In optical traps according to embodiments, the light beam is formed into the orienting hollow beam OHB having unequal axisymmetry directly or indirectly via one or more intermediate beams. In the latter case, the light beam may be first shaped and formed into an intermediate beam, such as a circular hollow beam having a hollow with a circular ring geometry from the beam of light, with appropriate optics. The intermediate is then shaped and formed into an orienting hollow beam, such as an elliptical hollow beam, using optics and/or mechanics, such as with optics elements or a computer-generated holograph. An optical focusing element then focuses the orienting hollow beam into a hollow cone that produces an optical trap.

Optics and/or mechanics 30 form and shape the light beam LB light into an orienting hollow beam OHB having unequal axisymmetry with a substantially hollow ring geometry cross-section and no angular momentum. This may be directly or indirectly from the light beam LB. Optics and/or mechanics 30 may include one or more physical optical elements, simulated optical elements, or some combinations thereof. Rotating means 35 may be separate from the optics and/or mechanics 30 or may be a part of or implemented by them.

Controlling the orientation of optically-trapped airborne particles is important. To this end, in some embodiments, the rotating means 35 control rotation of the optics and/or mechanics 30. When rotated, the focused orienting hollow beam OHB results in an unequal axisymmetric force applied to the trapped particle. Such force may control the velocity/speed and/or direction of the trapped particle. The particle rotation speed can be directly controlled by the optical means and the rotation can be stopped/paused at any specified orientation about the trapping beam axis, allowing for detailed particle characterization. More particular, the rotation may be configured to (i) start rotating in order to impart rotation to a trapped particle; (ii) change speed in order to alter the rotation of a trapped particle; (iii) stop or pause rotation in order to hold a trapped particle at a given angular orientation; and/or (iv) reverse the direction of rotation to change the rotational direction of a trapped particle.

Furthermore, orientation control for optically trapped airborne particles allows the speed and type of motion to be directly controlled. The optical trapping apparatuses and methods allow for externally-controlled motion in namely two modes of particle motion: circular or spin-rotation motion of trapped airborne-particles. As used herein, "circular-rotational motion" means circular motion substantially about a fixed axis whereas "spin-rotational motion" means motion around a small path about a fixed axis (e.g., circular, oval or elliptical) rather than around the fixed axis. Particles can be moved in a spin-rotational motion at low laser power (e.g., less than about 1.5W) or circular-rotational motion at high laser power (e.g. greater than about 1.5 W).

FIG. 1A is a schematic illustration of an optical trap 10A for trapping particles according to embodiments of the present invention. For instance, here the optics and/or mechanics 30 include optics 20 and 31 (which may be referred to first means and second means, respectively, for forming and shaping beams). Optics 20 form and shape the intermediate beam IB from the laser beam LB, and subsequently optics 31 shape and form the orienting hollow beam OHB from the intermediate beam IB. Optics 20 for shaping and forming the intermediate beam IB may comprise: a pair of axicon lenses, spatial light modulators (SLM), phase and amplitude mask, biaxial crystals, diffraction pattern, optical components configured to produce an aberration, and/or an interference pattern of coherent light source using a single or multiple laser or light beams to produce the circular hollow beam as non-limiting examples. And optics 31 for forming and shaping the intermediate beam LB light into an orienting hollow beam OHB may include a cylindrical lens, acylindrical lens, non-circular axicons, deforming mirrors, elliptical holographic diffusers, or anamorphic prism pairs as non-limiting examples. A separate rotation stage 36 provides the rotating means 35 which supports and rotates the optics 31. In that way, the orienting hollow beam OHB can be rotated in a controlled manner as discussed below.

FIG. 1B is a schematic illustration of an optical trap 10B for trapping particles according to embodiments of the present invention. Here, holographic means can be used to form and shape the orienting hollow beam OHB from the intermediate beam IB. For instance, optics and/or mechanics 30 include a spatial light modulator (SLM) 33 configured to generate a computer-generated hologram (CGH) of the orienting hollow beam. And, by using suitable software application, the CGH can be programmed to rotate the image on the SLM 33. Thus, the SLM 33 also provides the rotating means 35.

FIG. 1C is a schematic illustration of an optical trap 10C for trapping particles according to embodiments of the present invention. Here, the orienting hollow beam OHB is directly formed from the laser beam LB. For instance, the optics and/or mechanics 30 for forming and shaping the beam of light into the orienting hollow beam may include a spatial light modulator (SLM) 34 configured to generate a computer-generated hologram (CGH) of the orienting hollow beam directly from the beam of light LB. And, by using suitable software application, the CGH can be programmed to rotate the image on the SLM. Thus, the SLM 34 also provides the rotating means 35.

Figure 2:
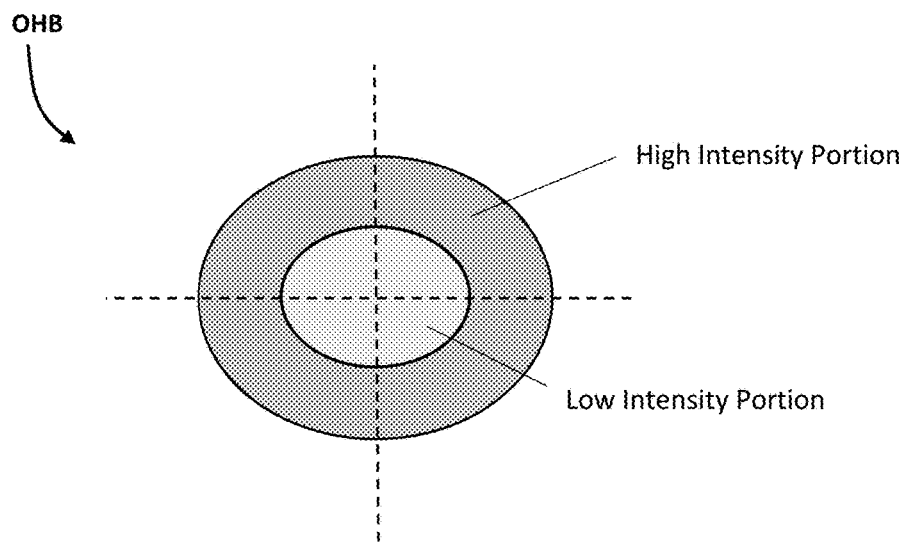
FIG. 2 shows a schematic of the orienting hollow beam having unequal axisymmetry used for optical trapping according to embodiments.

FIG. 2 shows a schematic of the orienting hollow beam OHB used for optical trapping according to embodiments. The center of the orienting hollow beam OHB has the lowest light intensity. Here, the contribution to the incident photon momentum along the optical axis is strongest. This effectively reduces the scattering force along the optical axis such that the gradient force is sufficient to achieve optical trapping at a much lower numerical aperture (NA) of focusing optics than used by a conventional optical trap such as laser tweezers. The use of a single focused beam enables simple alignment and the use of low NA focusing optics will make the trapping system easy to integrate with additional optical characterization tools. This greatly increases the versatility of the optical trap. This technology has been demonstrated for trapping of both absorbing and transparent particles.

The mechanism behind an orienting hollow beam OHB is an unequal, but axisymmetric horizontal trapping and stabilizing force. It is formed on a high intensity portion and a low intensity portion. The latter portion may be less than 5-10% of maximum intensity of the high intensity portion. This means that the inward forces of the high intensity portion along one axis are stronger than the other axes and that the distribution of inward forces must be bilaterally symmetric.

The distribution of forces "squeezes" the particle more tightly along one axis within the trapping region 50, causing the particle to settle in a preferred orientation. Additionally, the beam shape must not cause a transfer of angular momentum (like helical or vectored beams, and the like). Rather, the rotation mechanism must come from rotating the axes of the orienting hollow beam OHB, such as a hollow ellipse, or other similar axisymmetric hollow shape.

Here, the orienting hollow beam OHB is shown having an elliptical shape. (see also FIG. 6). For the elliptical hollow cone, the inward, horizontal trapping forces will be greater along one axis of the ellipse than the other (i.e., the particle is "squeezed" more tightly in one direction). Thus, the elliptical cone is better-suited to capture and hold irregular, three-dimensional shaped, particles than using a circular cone. Indeed, there will often be a preferred trapping orientation based on the balance of the trapping and gravitational forces on the particle. Since in this arrangement, the horizontal forces are not circularly symmetric, this orientation may change as the particle rotates.

The orientation control will allow imaging and/or measurements (such as Raman or elastic scattering signals) via the imaging and/or measuring system 60 to be collected for the same aerosol particle in multiple orientations, increasing the utility of these techniques. The optical trap 10 can be coupled or integrated with various analytical tools, particularly for real-time airborne aerosol detection and characterization for biological and chemical aerosol agents. For example, the orientation control system could be integrated into already commercially available setups for micro-Raman or micro-Fourier transform infrared (FTIR) spectroscopy to provide more 3D information than a traditional slide-mounted sample can, particularly for heterogeneous microparticle samples.

Figure 3A:
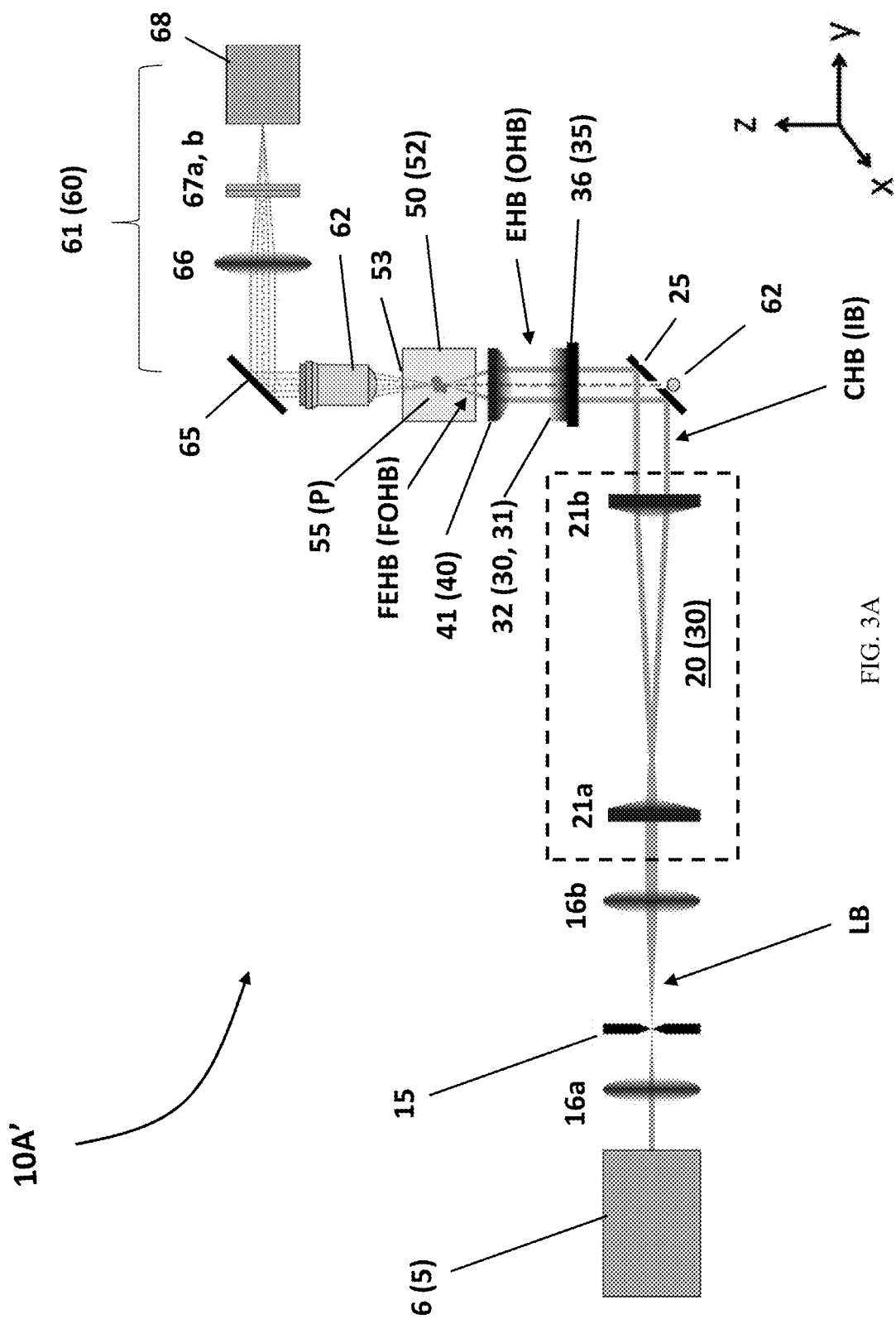
FIGS. 3A, 3B and 3C show more-detailed schematic illustrations of optical traps corresponding to those in FIGS. 1A, 1B, and 1C according to embodiments.

FIG. 3A is a more-detailed schematic illustration of an optical trap 10A' corresponding to the optical trap 10A in FIG. 1A according to another embodiment of the present invention. An elliptical hollow beam EHB is used for the orienting hollow beam OHB using an intermediate beam IB which is a cylindrical hollow beam CHB. The optical trap 10A' is specifically configured to generate the elliptical hollow beam of light having an elliptical geometry which when focused can trap and hold an airborne particle.

Figure 4:
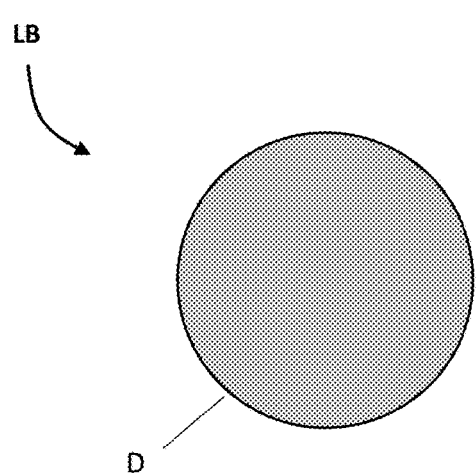
FIG. 4 is a schematic of the transverse cross-section of the light beam after exiting the laser and being further shaped by the iris.

The light source 5, here laser 6, generates a beam and is expanded into a collimated beam with diameter D indicated here as light beam LB (see FIG. 4). The particular wavelength of light used is not believed to be critical for the trap 10A', although there may be a multitude of reasons for selecting a particular laser. The laser light may be in the ultraviolet (UV), visible, and/or infrared (IR) wavelength region, for example. In one exemplary embodiment, laser 6 may be a 532-nm diode-pumped solid-state (DPSS) operating at a wavelength λ of 532 nm in continuous wave (CW) mode and providing approximately 2W of power that produces a Gaussian laser beam. In lieu of an actual laser, a light source with a high spatial coherence could be used to form the equivalent to light beam LB having a focal spot with high power, such as a super-luminescent diode or a super-continuum source.

In some embodiments, and as shown, additional optical elements may be included to further shape the light beam LB. For instance, an iris 15 may be used to adjust or tune the diameter of the light beam LB. It may be a simple pin hole iris or an adjustable iris comprised of multiple blades (e.g., 9 or 15), driven by a motor (not shown), which form an adjustable sized diaphragm opening. The iris is not strictly required for all embodiments. The light beam could be expanded to the appropriate diameter with the laser 6 and/or other optics, instead of over-expanding and then using the iris 15 as is shown in FIG. 3A. Additionally, a pair of lenses (e.g., 16a, fl=25 mm; 16b, fl=50 mm) may be provided in some implementations to expand or re-collimate the light beam LB.

A depiction of the cross-section of the light beam LB along the direction of propagation is shown in in FIG. 4. In one exemplary implementation, the light beam before the iris 15 had a diameter of approximately 2 mm and after the iris it was reduced the size to about 40 μm. This of course may depend on the specific light source and optics used.

Intermediate optics 20, also a part of the optics and/or mechanics 30, then take the light beam LB and shapes and forms it into a circular hollow beam CHB. For instance, intermediate optics 20 may include a set of one or more typical optical elements used for shaping light. The circular hollow beam CHB is shaped like a ring, that is, an annular region with a central opening or void. Such a circular ring geometry or profile can be generated by holography, spatial light modulators (SLM), phase and amplitude mask, biaxial crystals, diffraction pattern, aberration of optical components, or interference pattern of coherent light source using a single or multiple light beams as known in the art. Here, intermediate optics 20 are shown as a pair of axicon lenses (e.g., 21a and 21b, apex) angle=130°. Axicons 21 are conical lenses with a circular cross-section and a single apex angle that can expand the light beam into a circular ring.

Figure 5:
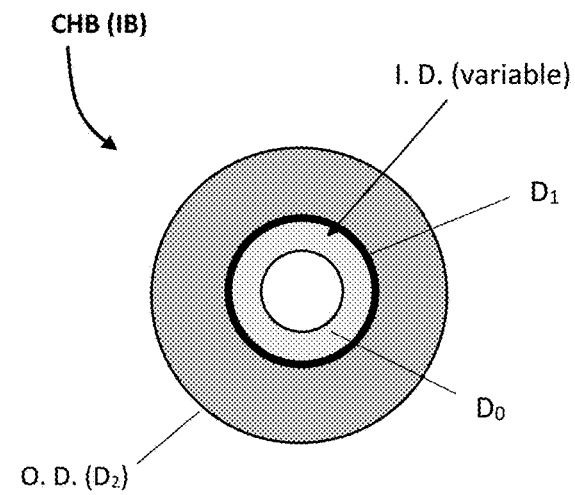
FIG. 5 is a schematic of transverse the cross-section of the circular hollow beam.

The inner diameter of the circular hollow beam CHB is controlled with the iris 15 (preferably tunable) before passing through the intermediate optics 20 to form a collimated hollow beam at the back focal plane of the cylindrical lens 30. The inner diameter of the hollow beam is adjusted to form an inner NA of the conically focusing region to form strong enough and stable trapping conditions. As the iris is closed, the ring width becomes narrower. Conversely, when the iris is opened, the ring width becomes wider. A depiction of the cross-section of the circular hollow beam CHB along the direction of propagation is shown in FIG. 5. The light beams are indicated in grey. The lighter grey rays depict the variable inner diameter of the circular hollow beam CHB.

The outer diameter of the circular hollow beam CHB may be controlled by the relative focal length of the intermediate optics 20 (e.g., the pair of axicons 21a and 21b), which act as a beam expander in addition to forming the ring shape of the circular hollow beam CHB. The outer beam diameter should be expanded to match the diameter of the optical focusing element 40 to gain the highest outer NA. The optical focusing element 40 may be an aspheric lens 41 (e.g., fl=12 mm), as a non-limiting example. In general, the circular hollow beam CHB is expanded to match the diameter of focusing optical element 40 (e.g., lens, objective, or mirror) before being focused. For a lens with outer diameter of 24 mm, and focal length of 18 (NA outer=0.55), the inner diameter could be about 21 mm, corresponding to NA inner=0.5, for example.

The inner and outer diameters of the circular hollow beam CHB also define the elliptical hollow beam EHB. Thus, once they have been set, the optical trap 10A' can be used for most particles without changing these parameters. The beams would generally stay the same and be turned 'on' to hold a particle in place and then the light beam could be turned 'off' or blocked altogether (e.g., with a shutter) to release a particle.

In some embodiments, additional optical elements can be interposed along the beam path. As shown in FIG. 3A, a 45° mirror 25 is provided which changes the directed to the circular hollow beam CHB. This enables a more compact system and/or the direction of the circular hollow beam CHB and/or other beam is to be changed. Mirror 25 may be omitted in other embodiments if space is not a primary concern. As shown, the circular hollow beam CHB is reflected upwards, and perpendicular to the direction of propagation by the 45° mirror 25 and through an optical means for forming the orienting hollow beam OHB using an intermediate beam IB which is a cylindrical hollow beam CHB. Other intermediate beam shapes may be used.

Optics 31 which shape and form the orienting hollow beam OHB from the intermediate beam IB may be implemented by various optical element. For instance, optics 31 may be a cylindrical lens 32 as shown. The cylindrical lens 32 may be a CVI Laser Optics' model number SCX-50.8-5000.0-C-415-700 as one non-limiting example. It has a long focal length (e.g., fl=5000 mm). This is in contrast to a spherical lens which tends to focuses light to a point. The cylindrical lens 32 may be formed of a curved surface or surfaces which are sections of a cylinder. Together, they focus the light passing through it into a line parallel to intersection of the surface of the lens and a plane tangent to it along the cylinder's axis. The cylindrical lens 32 converges the light in the direction perpendicular to this line and leaves it unaltered in the direction parallel to the axis of the cylinder. Since cylindrical lens 32 focuses light primarily in only one direction, it deforms, by compressing, the circular hollow beam CHB into an oval ring, which is approximated by an ellipse, due to the large radius of curvature of the lens. We refer to the beam formed as an elliptical hollow beam EHB given that it has an elliptical ring geometry. (see FIGS. 7A-7D).

The cylindrical lens 32 may be mounted onto rotation means 35, here a rotation stage 36 that allows the orientation of the cylindrical lens 32 to be rotated and controlled. (see FIG. 8). In some implementations and embodiments, the rotation stage 36 could be manually-rotated such as with a simple turning wheel which a user can manipulate with his/her fingers. More preferably, though, and envisioned for most implementations and embodiments, the rotation stage 36 is motorized rotation stage driving by a motor or other actuator, such as a highly-controllable step-motor. When the cylindrical lens 32 is rotated by the stage 36, the axes of the elliptical cone of the focused elliptical hollow beam FEHB will also rotate. The inward trapping forces at the focal point would be slightly stronger along the short axis than along the long axis. This bilaterally symmetric difference in force generates a torque on the trapped particle P as the axes are rotated. Thus, as the cylindrical lens 32 is rotated, a torque is exerted on the trapped particle, resulting in circular or spin-rotational motion of the trapped particle. The rotating cylindrical lens 32 can be stopped at any particular position with the stage 36 as may be desired for viewing, imaging, or for additional measurement/analysis. The speed and direction of rotation of the cylindrical lens 32 can also be varied with the stage 36.

In other embodiments, the optics 31 may be an acylindrical lens such as Thorlabs' AYL-series acylindrical lenses as non-limiting examples. Such lenses deform the beam only along one axis, producing a suitable shape for generating the orienting hollow beam OHB, such as having an elliptical shape.

For embodiments using axicons, the axicons could have an elliptical cross-section with an apex angle that varies as a function of the elliptical axes for generating orienting trapping beam. This type of axicon will produce a ring with non-uniform illumination that has "spots" arranged in a bilaterally symmetric pattern as discussed in Xiahui Zeng and Fengtie Wu, "Effect of elliptical manufacture error of an axicon on the diffraction-free beam patterns," Optical Engineering, 47 (8), 083401 (2008), herein incorporated by reference in its entirety. Assuming elliptical axicons are not commercially-available at this time, they could certainly be manufactured for use in optical trap.

Other embodiments may use an elliptical a holographic diffuser; it is formed of a grating-like surface that scatters light in a preferential direction that can shape a collimated circular beam into an ellipse. For example, one might use the holographic diffusers from Edmund Optics Inc., as non-limiting examples. An elliptical hollow ring can also be generated using an anamorphic prism pair as shown in FIG. 3 of Jingtao Dong, "Line-scanning laser scattering system for fast defect inspection of a large aperture surface," Appl. Opt. 56, 7089-7098 (2017), herein incorporated by reference in its entirety.

The elliptical hollow beam EHB is then directed to the back focal plane of the optical focusing element 40, such as the aspheric lens 41, as shown, which focuses it into a trapping region 50. The aspheric lens 41 (e.g., fl=12 mm), shown in FIG. 3A, may be placed a few centimeters above the cylindrical lens 32 and to focus the elliptical hollow beam EHB into a focused elliptical hollow beam FEHB which is an elliptical hollow cone. More particularly, the optical focusing element 40 focuses the elliptical ring of elliptical hollow beam EHB into a thin line at the focus rather than a circular point. Various views of the focused elliptical hollow beam FEHB are shown in FIGS. 7A-7D.

In some embodiments, the trapping region 50 may defined by a chamber or containment cell 52 formed of a light transparent material, like glass or polycarbonate. The cell 52 has one or more small orifices in it for introducing aerosol particles 55 into the trapping region 50. This arrangement helps to minimize air turbulence near the trapping position. The focused elliptical hollow beam FEHB is arranged to come to a focus at a spot inside the trapping region 50.

The optical focusing element 40 forms a hollow elliptical-conical focus within the trapping region 50 where airborne particles 55 are present. The aspheric lens 41 as shown may be formed of glass, polycarbonate, or other materials having a refractive index of about 1.3-3.9 as an example. If using a lens, as shown, it may has a numerical aperture (NA) preferably less than or equal to 0.95. For instance, it could be 0.55-0.95. In one particular embodiment, it is approximately 0.55. However, the optical focusing element 40 could alternatively be a microscopic objective or a reflective focusing mirror (parabolic or spherical reflector) instead of lens in other embodiments.

Particles 55 in the trapping region 50 can be trapped and held by the focused elliptical hollow beam FEHB having the hollow elliptical-conical geometry at or near its focal point. We believe that the trap will work most efficiently if the light is propagating upward (against gravity) in the focal region of the trapping region 50. It should also work with the light travelling with gravity (i.e., aimed down). If the cone is formed sideways the trapping may not be as efficient).

A single trapped particle is indicated as P. The size of the particles 55 may vary depending on the environment and/or desired application(s). Airborne particles ranging from 0.6 to 100 micrometers may be quite common in some environments. Typical sizes of a single or aggregates of a group of bacteria and bacterial spores may range from 0.6 to 10 μm. Typical sizes of anthrax spores range from 1.1 to 1.7 μm in length and 0.8 to 0.9 μm in diameter. Typical sizes of fungal spores may range 2 to 20 μm in diameter. Pollens typically can be 5 to 100 μm in diameter. These exemplary particles as well as other larger or smaller in diameters should be able to be held with the trap 10A'. Typically, it is envisioned that the optical trap 10A' will trap and hold only about one particle at any one time. Although, simultaneous trapping of multiple particles can be realized by forming multiple conically focusing regions using holography, SLM, or interference pattern, for instance.

The optical trap 10A' utilizes the radiative pressure of light to trap and hold transparent (non-absorbing) airborne particles while the photophoretic force is able to trap absorbing particles in the same optical geometry formed of a single shaped light beam. The radiative pressure force results from the transport of momentum from photons to a particle. More particularly, radiative pressure forces are a combination of a gradient force and a scattering force. If a particle is near the focus of a light beam, the gradient force will pull the particle back toward the high intensity region at the focus, providing the restoring force required to trap a particle. On the other hand, the scattering force, which results from the transfer of momentum from photons scattered off a particle, pushes the particle in the direction of light propagation and does not provide the required restoring force. Roughly speaking, optical trapping is possible when the gradient force overcomes the scattering force.

By comparison, the photophoretic force results from the interaction between a heated particle and the surrounding gas molecules. If a light beam impinges on an absorbing particle, some of the light will be absorbed and converted to heat. In particular, if a particle is heated asymmetrically (e.g., if a strongly absorbing particle is illuminated from one side), then gas molecules on the higher temperature side of the particle will also heat up and subsequently collide with the particle at higher velocities, imposing a net force pushing the particle toward its cold side. For a strongly absorbing particle, this photophoretic force can be 4 to 5 orders of magnitude stronger than the gradient force typically used in optical tweezers.

While a particle P is trapped and held in the trapping region 50 of the optical trap 10A, the trapped particle P can be imaged and/or one or more properties of that trapped particle P may be measured or otherwise detected. One or more imagining and/or measuring devices/systems 60 may be positioned proximate to the trapping region 50 for this purpose. There may be a window or opening 53 in the trapping region 50 to enable measurement of trapping particles to be made. The window may be made of glass or other light transparent material. In FIG. 3A, the window 53 is shown as being opposed to the focusing lens 41. However, this is merely illustrative and it will be appreciated that it may be placed at other locations relative to the trapping region 50. Also, there may be multiple windows 53 for multiple measurements apparatus at any desired locations, such as surrounding the trapping region 50 also.

It should be appreciated that beam forming, shaping and focusing are not perfect. For instance, dimensional irregularities and manufacturing tolerances as well as aberrations, defects, imperfections, or the like, in the various optical elements cause imprecisions in desired beam profiles which aggregate along the beam path. As such, the term "circular" as used herein may mean purely circular as well as substantially circular, nearly circular and circular-like shapes, the latter group being within about ±1-5% of the dimensions of a corresponding pure circle and even up to ±10% of the dimensions of a corresponding pure circle in some instances. A circle is characterized by a focus (center point) and a radius/diameter. The term "elliptical" as used herein may mean purely elliptical as well as substantially elliptical, nearly elliptical and elliptical-like shapes (which may include oval, oblong, and ovoid shapes), the latter group being within about ±1-5% of the dimensions of a corresponding pure ellipse and even up to ±10% of the dimensions of a corresponding pure ellipse in some instances. An ellipse is characterized by two foci (points) and a major and minor axes.

Figure 3B:
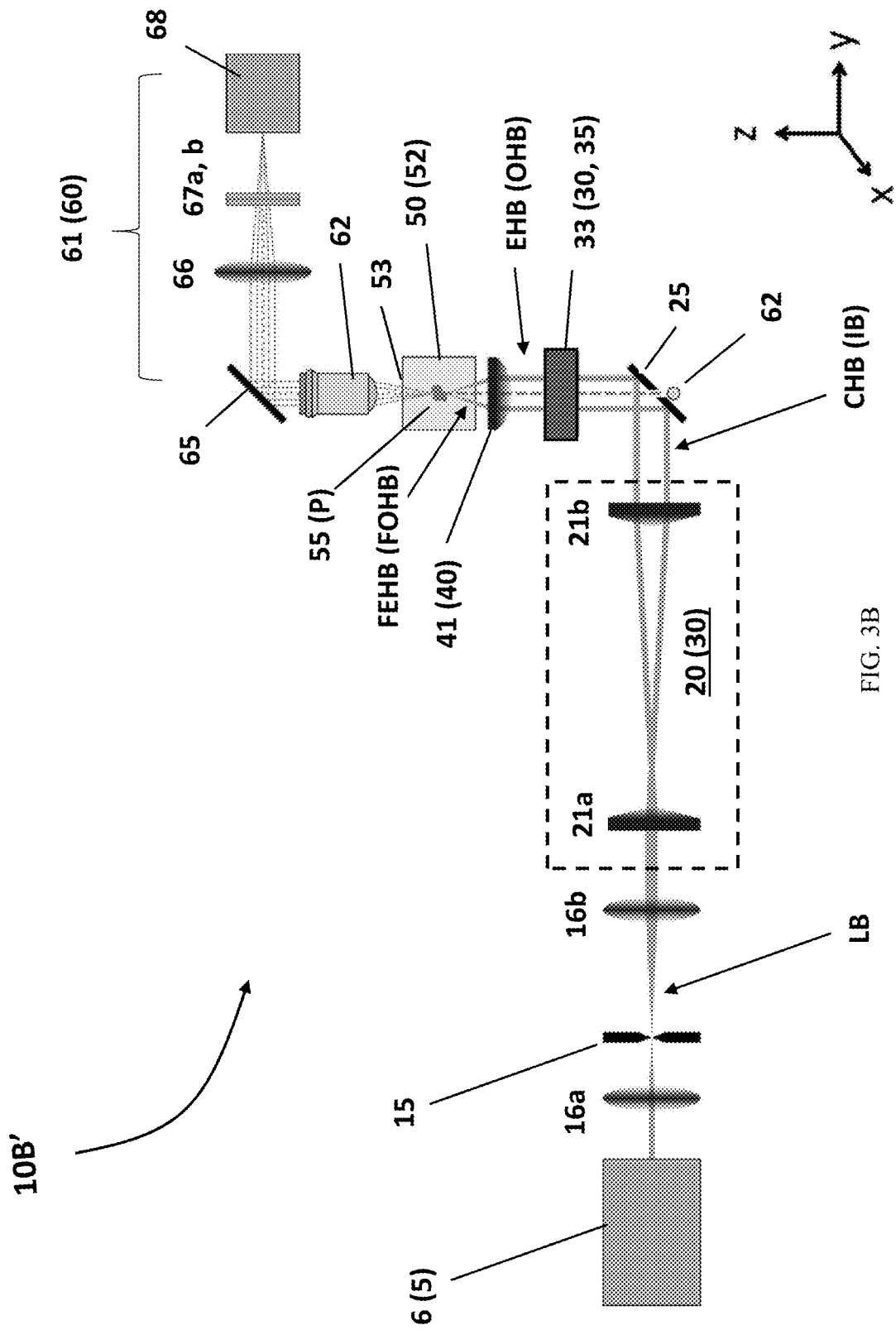

FIG. 3B is a more-detailed schematic illustration of an optical trap 10B' corresponding to the optical trap 10B in FIG. 1B according to another embodiment of the present invention. Rather than using physical optical element(s) 31 optics and/or mechanics 30, it uses a spatial light modulator (SLM) 33 for simulate optics using a computer-generated hologram (CHG). SLM 33 augments light either as it passes though it (transmissive) or reflects from it (reflective). Here, the CHG simulates deforming the intermediate beam IB, e.g., the circular hollow beam CHB, similar to the physical optical element(s) 31 in FIG. 3A.

For instance, SLM may be a Holoeye Photonics AG's LC 2012 transmissive spatial light modulator as a non-limiting example. A reflective SLM might also be used; but it would be located off-axis thus requiring additional optics (such as mirrors or other reflectors, like parabolic reflector) to reflect light to and from it. Programming the SLM with a CGH can produce different optical element, like lenses including axicons or cylindrical lenses, as non-examples. For instance, Holoeye Photonics AG also sells SLM Pattern Generators which may be used in embodiments. Such generators include computer software which controls the SLM to generate diverse dynamic optical functions like gratings, lenses, axicons and apertures as well as the calculation of diffractive optical elements (DOE) from user defined images. These optical elements provide rotating means 35 by rotating the programmed CGH image thereon. Thus, rotating means 35 is also provided by the SLM 33.

Figure 3C:
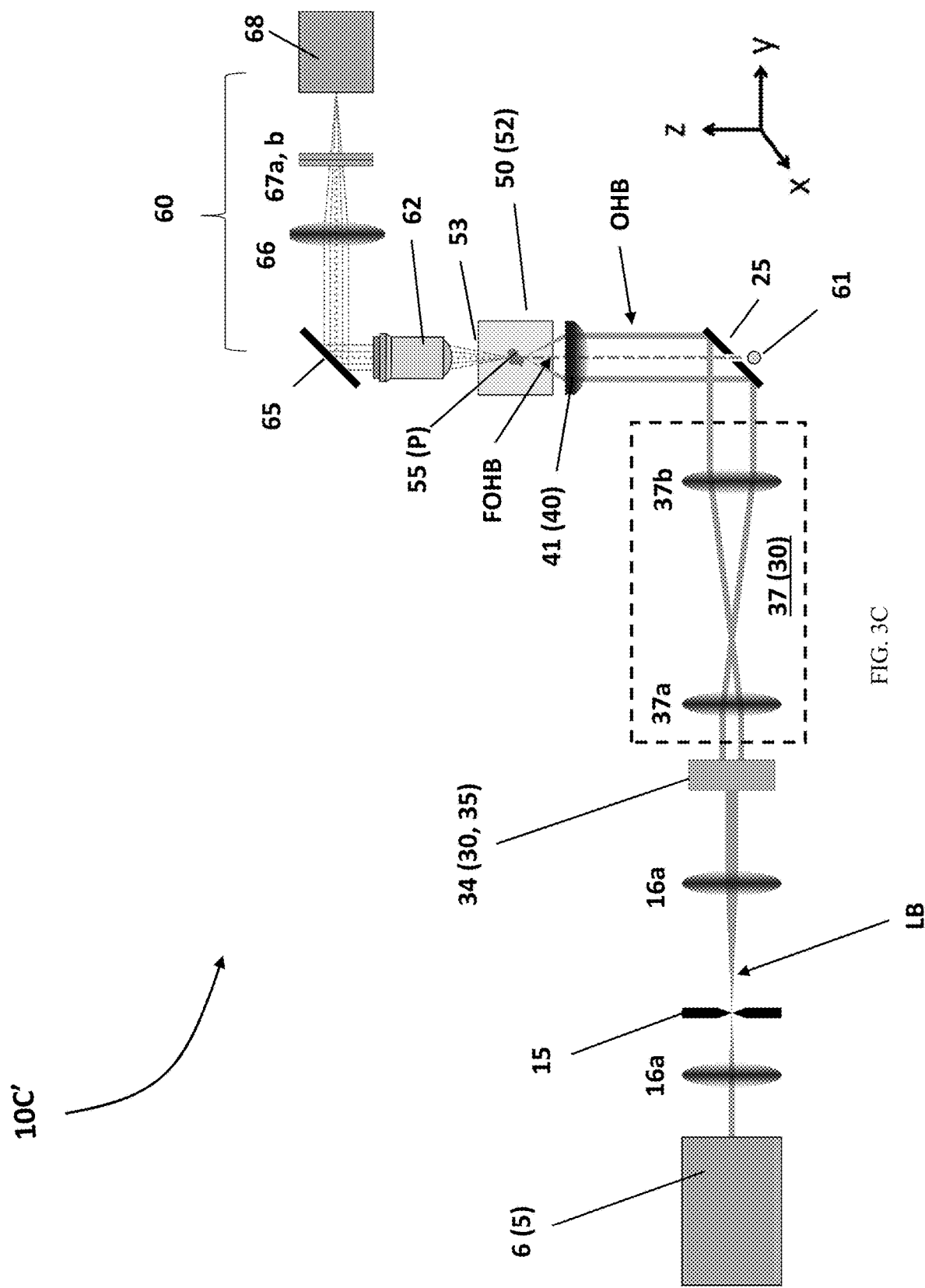

FIG. 3C is a more-detailed schematic illustration of an optical trap 10C' corresponding to the optical trap 10C in FIG. 1C according to another embodiment of the present invention. Here, the orienting hollow beam OHB is directly generated from the laser beam LB. There is no intermediate beam IB nor optics 20. It uses a SLM 34 as the optics and/or mechanics 30 for forming and shaping the orienting hollow beam OHB. For instance, the SLM 34 may be from Holoeye Photonics AG in non-limiting examples. In this optical trap, the laser beam LB after being optionally collimated goes straight to the SLM 34. There are many different algorithms for generating hollow beams with CGH, however, they often impart orbital or spin angular momentum (OAM or SAM) on the particles, such as Mathieu or vortices beams, which would limit the ability to stop/start rotation at a particular orientation and/or control the speed of the rotation. These are not desired. Thus, one possibility for embodiments is to use the anomalous hollow beams described in Yangjian Cai et al., "An alternative theoretical model for an anomalous hollow beam," Opt. Express 16, 15254-15267 (2008), herein incorporated by reference in its entirety, with low central intensity (e.g., less than about 5-10% of the high intensity portion of that hollow beam).

Optics and/or mechanics 30 may include additional optics 37 for further shaping the beam into the orienting hollow beam OHB in some embodiments and implementations, if desired. Thus, once the desired shape has been generated by passing the beam through the SLM 34, the shape can be enlarged, if necessary, by a pair of lenses 37a and 37b, before reaching the first 45-degree mirror 25 and then the optical focusing element 40. The shaped beam would come to a focus in the trapping region 50. The orienting hollow beam OHB can be rotated by directly programming the SLM 34 with a rotating CGH and not a separate rotating stage.

FIGS. 4-7 show schematics of the light beams along the direction of propagation in the optical trap 10A' illustrated in FIG. 3A. In actuality, these beams are one contiguous beam of light which is manipulated at different points as it propagates within the apparatus.

To begin, FIG. 4 is a schematic of the transverse cross-section of the light beam LB after exiting the laser 6 and further shaped by at least the iris 15. It is generally circular and has a diameter D defined by the laser 6. Its diameter can be further adjusted by the iris 15 to a desired diameter or directly expanded to a desired diameter. Optics 20 takes the light beam LB and forms a hollow beam CHB.

FIG. 5 is a schematic of transverse the cross-section of the circular hollow beam CHB. It is shaped like a circular ring, that is, as an annular region with a central void. It is defined by an inner diameter I.D. and an outer diameter O.D. The inner diameter I.D. is variable or adjustable and controlled by the iris 15. It may vary between a minimum inner diameter Do and a maximum inner diameter $D_1$. The outer diameter is $D_2$. As the iris 15 is closed, the ring width (i.e., the distance between the inner and outer diameter) becomes narrower. And conversely, as the iris 15 is opened, the ring width becomes wider.

Figure 6:
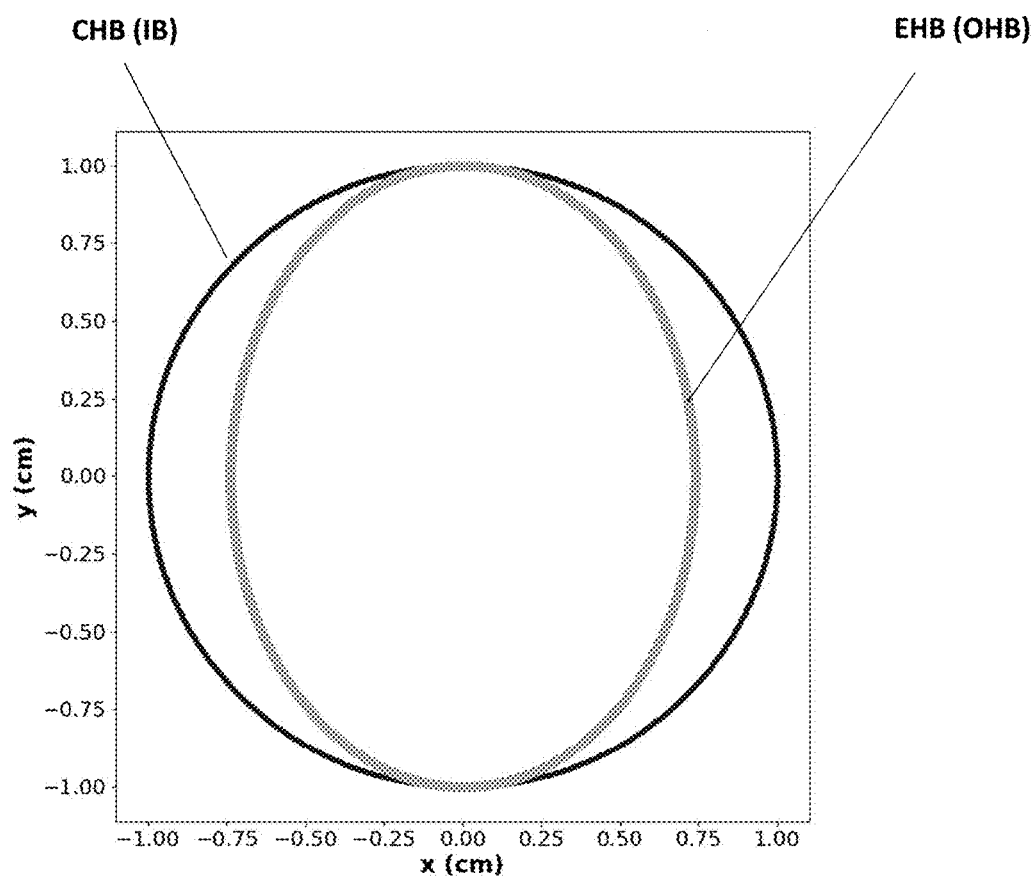
FIG. 6 shows cross-sections of the outer profile of the circular hollow beam and an elliptical hollow beam.

FIG. 6 shows cross-sections of the outer profile of the circular hollow beam CHB and an elliptical hollow beam EHB. (Although, not shown here, like the circular hollow beam CHB, the elliptical hollow beam EHB includes an outer annular region with a central opening or void of substantially no intensity similar to FIG. 5). The circular hollow beam CHB is compressed into the elliptical hollow beam EHB by the cylindrical lens 32 (or by other optics 30, 31). In this example, the initial radius of the circular beam is 1 cm, the radius of curvature of the lens is 20 cm and the cross-section of the compressed hollow beam is at a distance of z=10 cm from the cylindrical lens.

Unlike plano-convex or biconvex spherical lenses that bring light rays to a single focus, cylindrical lenses only focus light along one dimension. We can use the vector form of Snell's Law to derive a formula for how a circular hollow ring is shaped by the cylindrical lens into an elliptical hollow beam. We use a coordinate system where the radius of curvature of the cylindrical lens is centered on the origin and the incoming hollow beam propagates parallel to the $\hat{z}$ axis (see FIG. 3A). In this coordinate system, the shape of the circular hollow beam with a radius $r_h$ is expressed as, $x^2+y^2=r_h$. The horizontal cross-section of the cylinder at any y, is $x^2+z^2=R_c$ where $R_c$ is the radius of curvature of the cylindrical lens.

The incident vector is $\vec{1}=0\hat{x}+0\hat{y}+1\hat{z}$, the vector normal to the surface of the cylindrical lens is $\vec{n}=x/R_c\hat{x}+0\hat{y}+z/R_c\hat{z}$, and the indices of refraction of the incident and transmission media are $n_1$ and $n_2$, respectively. According to Snell's Law the transmitted ray ($\vec{t}$) is $$\left[\vec{t} = \frac{n_1}{n_2}[\vec{i} - \vec{n}(\vec{n}\cdot\vec{i})] + \vec{n}\sqrt{1 - \frac{n_1^2}{n_2^2}[1 - (\vec{n}\cdot\vec{i})^2]}\right] \quad (1)$$

Plugging in the values of the incident and normal vectors are $$\left[\vec{t} = \left(\frac{-n_1}{n_2}\frac{xz}{R_c^2} + \frac{x}{R_c}\sqrt{1 - \frac{n_1^2}{n_2^2}\left[1 - \frac{z^2}{R_c^2}\right]}\right)\hat{x} + 0\hat{y} + \left(\frac{n_1}{n_2}\left(1 - \frac{z^2}{R_c^2}\right) + \frac{z}{R_c}\sqrt{1 - \frac{n_1^2}{n_2^2}\left[1 - \frac{z^2}{R_c^2}\right]}\right)\hat{z}\right]$$

because the cylindrical lens does not change the beam bath in the $\hat{y}$ direction, it is convenient to write $\vec{t}$ solely a function of y so that the x coordinates of the modified hollow beam can be computed as a function of distance from the cylindrical lens as follows:

$$\left[\vec{t} = \left(\frac{-n_1}{n_2}\frac{x\sqrt{R_c^2 - x^2}}{R_c^2} + \frac{x}{R_c}\sqrt{1 - \frac{n_1^2}{n_2^2}\frac{x^2}{R_c^2}}\right)\hat{x} + 0\hat{y} + \left(\frac{n_1}{n_2}\left(\frac{x^2}{R_c^2}\right) + \frac{\sqrt{R_c^2 - x^2}}{R_c}\sqrt{1 - \frac{n_1^2}{n_2^2}\frac{x^2}{R_c^2}}\right)\hat{z}\right] \quad (3a)$$

Or if rewritten, it is:

$$\vec{t} = \left(\frac{-n_1}{n_2}\frac{\sqrt{r_h^2 - y^2}\sqrt{R_c^2 + y^2 - r_h^2}}{R_c^2} + \frac{\sqrt{r_h^2 - y^2}}{R_c}\sqrt{1 - \frac{n_1^2}{n_2^2}\left[\frac{r_h^2 - y^2}{R_c^2}\right]}\right) \quad (3b)$$

$$\hat{x} + 0\hat{y} + \left(\frac{n_1}{n_2}\left(\frac{r_h^2 - y^2}{R_c^2}\right) + \frac{\sqrt{R_c^2 + y^2 - r_h^2}}{R_c}\sqrt{1 - \frac{n_1^2}{n_2^2}\left[\frac{r_h^2 - y^2}{R_c^2}\right]}\right)\hat{z}$$

If $$\alpha = \frac{n_1}{n_2}, \beta = \sqrt{1 - \frac{n_1^2}{n_2^2}\left[\frac{r_h^2 - y^2}{R_c^2}\right]}, \gamma = \frac{\sqrt{r_h^2 - y^2}}{R_c}, \text{ and } \delta = \frac{\sqrt{R_c^2 + y^2 - r_h^2}}{R_c}$$

then the above equations can be simplified to:

$$[\vec{t} = (-\alpha\gamma\delta + \beta\gamma)\hat{x}, 0\hat{y}, (\alpha\gamma^2 + \beta\delta)\hat{z} \quad (4)$$

The cylindrical lens in our trapping and rotation setup has a very long focal length of 1000 cm, leading to a large radius of curvature $R_c$=500 cm and only a modest compression in the $\hat{x}$ direction of 0.5%.

FIGS. 7A-7D show various views of the focused elliptical hollow beam FEHB in the trapping region 50. FIG. 7A shows an isometric view (without a trapped particle present); FIG. 7B and FIG. 7C shows side view of the long and short axes, respectively; and FIG. 7D shows a top view. The latter three views show a trapped particle P in the trapping region 50. The focused elliptical hollow beam FEHB has an elliptical hollow cross-sectional shape in the x-y plane as apparent in FIG. 7A. The trapping axis is along z. After the elliptical cone of the focused elliptical hollow beam FEHB converge to the focal point, it will diverge back into another elliptical cone. (The eccentricity is exaggerated here for illustration purposes). The small black ring in FIG. 7A shows a horizontal (perpendicular to the trapping axis) cross-section of the elliptical cone in the 3D isometric view (the 2D top-down view of this section is shown in FIG. 7D). The focusing optical element 40 (e.g., lens 41 in FIG. 3A) focuses the light such that it is collimated and contracts towards the focal point and expands and diverges thereafter. The focal point of the elliptical cone is not an infinitesimal point, but in actuality is a small area limited by the wavelength of light, i.e. the diffraction limit, approximately λ/2. The major (long) and minor (short) axes of the elliptical hollow cone preferably are perpendicular to the downward gravitational force on the trapped particle(s). (see FIGS. 7B and 7C). The inward trapping forces at the focal point would be slightly stronger along the short axis than along the long axis. This bilaterally symmetric difference in force generates a torque on the trapped particle as the axes are rotated.

The elliptical-conical optical trapping geometry of the focused elliptical hollow beam FEHB can then be described by the outer NA, which is fixed by the focusing lens 41 or other optical focusing element, and the inner NA which can be continuously adjusted using the iris 15. The conical focus of the beam FEHB is defined by the NA of the focusing element 40. By adjusting the beam size before the optics 20 (e.g., the axicon lenses 21a and 21b) with the tunable iris 15, the size of the inner hollow region of the circular hollow beam CHB, i.e., NA, can be continuously adjusted.

The physics behind optical trapping force on a trapped airborne particle were previously disclosed for a circular hollow beam focused into the trapping region in the U.S. Pat. No. 9,443,631 titled "Optical Trap Using a Focused Hollow-Beam for Trapping and Holding Both Absorbing and Non-Absorbing Airborne Particles" to Yongle Pan and Brandon F. Redding, herein incorporated by reference in its entirety. (see FIGS. 3(A)-(C) and their corresponding description therein showing the optical trapping with a focused circular hollow beam). Additionally, empirical results for a focused circular hollow beam are shown and described in the '631 patent too. (see FIGS. 5(A)-5(D) and 6(A)-6(D) and their corresponding description therein). It will be appreciated that the trapping physics and effects will similarly occur for a focused orienting or elliptical hollow beams (except as otherwise described herein) which play a part in embodiments of the present invention.

In the present invention, the trapping forces of the elliptical cone produced by the focused elliptical hollow beam FEHB have both photophoretic and radiation pressure forces. The radiation pressure includes a vertical component known as scattering force resulting from the transfer of momentum from incident photons to the particle. In the vertical arrangement of FIG. 3A, the scattering force pushes the particle along the light propagating axis, and that balances the gravitational force. A horizontal component that enhances the stability of the trap results from the gradient force that tends to pull the particle in the direction of the field gradient, towards the focal point.

Figure 8:
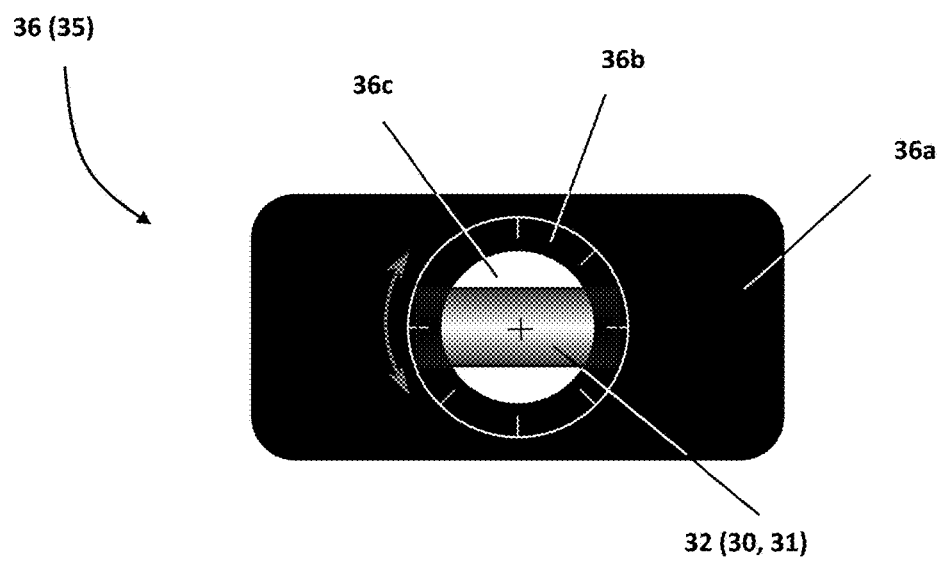
FIG. 8 is a top view of the rotation stage which may be used as one type of rotating means of the optical trap according to an embodiment.

FIG. 8 is a top view of the rotation stage 36 of the optical trap 10A' in FIG. 3A. It includes a fixed portion 36a which attaches to optical trap 10A, and a moveable portion 36b which rotates with respect to fixed portion 36*a*. There is a transparent region 65*c* which permits light to pass through; it may be a physical opening or a transparent window. The circular hollow beam CHB enters the cylindrical lens 32 which compresses it to form the elliptical hollow beam EHB. (In the orientation shown, the circular hollow beam CHB enters from the bottom and the cylindrical surface of the cylindrical lens 32 faces upwards and its flat back surface downward; but other orientations are certainly envisioned). The cylindrical lens 32 is mounted on the moveable portion 36*b* so that it can rotate. The moveable portion 36*b* may be supported on bearings and/or a track to easily permit rotational motion. An actuator or motor (not shown) drives the moveable portion 36*b*. The axis of rotation of the both the cylindrical lens 32 and the moveable portion 36*b* generally coincides with the longitudinal (z-axis) axis of the entering circular hollow beam CHB as well as the exiting elliptical hollow beam EHB.

As one non-limiting example, the rotation stage 36 may be a Thorlabs' model K10CR1 motorized rotation mount for optics which is formed of a stepper motor. This particular stage is software-controlled and can rotate at an angular speed between 1-8 degrees per second. It will be appreciated that other speeds may be desirable though for the optical trap 10A. When the cylindrical lens 32 is rotated, the axes of exiting elliptical hollow beam EHB as well as the focused elliptical hollow beam FEHB exiting the optical focusing element 40 rotate. Again, the rotational stage 36 can be stopped to hold the focal point of the focused elliptical hollow beam FEHB at any given angular orientation of the semi-major axis of the elliptical cone in the trapping region 50. The speed and direction of rotation of the stage 36 can also be varied.

In the embodiment depicted in FIG. 3A, the optical trap 10A is specifically designed to magnify and image trapped particle(s) P in the trapping region 50. To these ends, as shown, the optical trap 10 includes an imaging system 61 as system 60. To provide sufficient lighting to image the particle a light source 62 illuminates the sample trapping region 50. For instance, the light source 62 may be a white-light-emitting diode (LED). As shown, the LED 62 illuminates the sample trapping region 50 from below through a small hole in the center of the 45° mirror 25. Like mirror 25, mirror 65 enables a more compact imaging system and may be omitted in other embodiments if space is not a concern. A microscope objective lens 62 (e.g., N.A.=0.55, WD=13 mm, tube lens fl-200 mm) is placed above the trapping region 50 to collect scattered light for imaging, and a second 45° mirror 65 that reflects the scattered light through a focusing lens 66, a stacked filter 67 (e.g., as shown, comprised of a long-pass filter 67*a* and a quad-notch filter 67*b*) configured to block the trapping beam produced by the laser (e.g., wavelength of 532 nm) while allowing enough of the scattered LED light to pass through into an imaging device 68, such as an intensified charged-couple device (ICCD, e.g. from Andor iStar). Then the position and orientation of the trapped particle are monitored by the ICCD. Alternatively, a conventional camera may be provided for imaging device 68. Still images and/or video footage of trapped particles may be taken with the imaging device 68. Other measurements may include, for example, Raman, fluorescence, thermal emission, laser-induced breakdown spectroscopy (LIBS), spark-induced breakdown spectroscopy (SIBS), elastic scattering over one, a few or many angles or wavelengths. The Raman, fluorescence, thermal emission, LIBS and SIBS may each be measured at one or more emission bands, including the case of sufficient bands to be considered a spectrum. The foregoing list is not exhaustive and other measurement techniques may be used. Devices for performing such measurements are generally known and will not be described in greater detail.

The spatial resolution of the image on the ICCD 68 may be calibrated by an optical fiber and trapped beads (e.g., NIST calibrated polysterene microspshere) of known sizes. Each of the images shown herein have an image resolution of approximately 0.5 μm per pixel. To demonstrate active, controlled rotational motion we choose a mineral sample, Martian regolith simulant JSCMars-1, as it consists of solid particles in the desired size range (tens of μm). JSC Mars-1 consists primarily of palagonite (a weathered volcanic glass with basalt-like composition) with trace amounts of plagioclase feldspar (a silicate mineral), and magnetite. The refractive index and scattering properties of these particles are detailed in D. D. Dabrowska, et al., "Scattering Matrices of Martian Dust Analogs at 488 nm and 647 nm," Icarus, 250, 83-94, 2015, herein incorporated by reference in its entirety. Samples consisting of aggregates of smaller particles such as grass spores, pollen, or carbon nano-tubes were also tested, and some broke apart during the rotation process.

FIGS. 9-13 are representative images taken using optical trap we built according to corresponding to the optical trap 10A' shown in FIG. 3A. The small crossbar in each image shows the approximate center of motion and is about 30 μm in scale. The orientation of the cylindrical lens is shown in the lower left of each panel of the sequence. The particle returns to the same orientation upon repeated rotations of the cylindrical lens, c.f. the top and bottom rows. The small crossbar in each image shows the approximate center of motion and is about 30 μm in scale. (Additional videos of the same particle showing control of rotation speed and direction are available online in the Supplemental Section of our 2021 Optics Letters paper discussed below. Each video begins with 15*s* showing stable trapping of the particle prior to initiating the rotation of the cylindrical lens).

The circular or spin-rotational behavior of the trapped particle depends on the laser power level as well as the particle shape and size. We observe that at high laser power, the behavior is more of a smooth circular motion. As the laser power decreases, particles spin but also experience sudden jumps in orientation. After lowering the power further, trapped particles experience smooth spin-rotational motion that can be controlled by the direction and angular velocity of the cylindrical lens 32. At what laser power these transitions occur depends on the particle size, shape, and composition.

Figure 9:
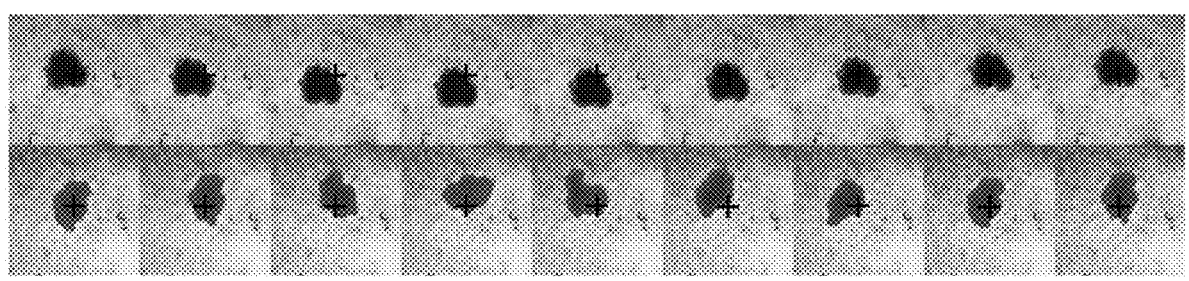
FIG. 9 is an image series comparing circular and spin-rotational behavior of similarly sized particles at high and low trapping laser power, respectively.

FIG. 9 is an image series comparing circular vs. spin-rotational behavior of similarly sized palagonite particles (i.e., JSC Mars-1 particles, approximately 10 μm in diameter) at high and low trapping laser power level, respectively, through 180° counter-clockwise motion of the cylindrical lens 32. The top sequence shows a particle in circular motion at higher laser power (1.25 W). In the bottom sequence, a similarly sized particle undergoes spin-rotational motion at lower laser power (70 mW). The pure circular motion (top row) has a radius of motion of 12 μm, and the spin-rotational motion (bottom row) occurs about a small circle rather than a fixed axis. This small circle has a radius of 7 μm. The small crossbar in each image shows the approximate center of motion and is 30 μm in scale.

Figure 10:
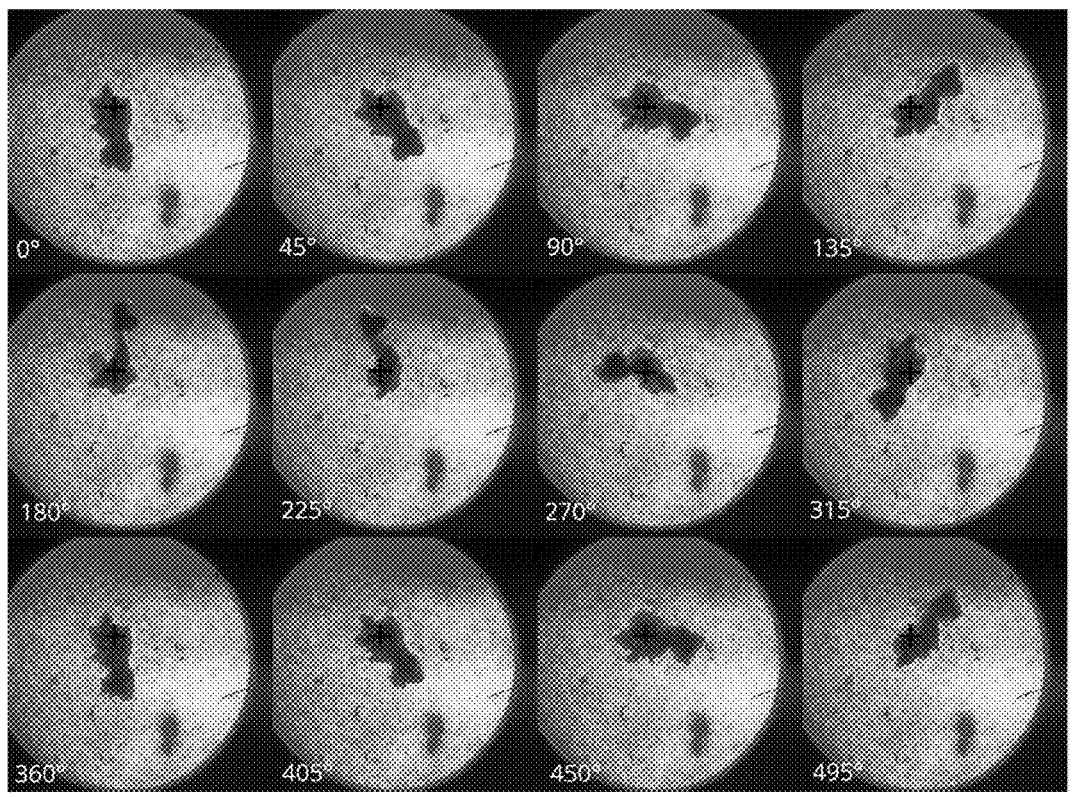
FIG. 10 is an image series of a trapped spinning particle.

FIG. 10 shows an image series of a trapped spinning larger JSC Mars-1 particle (>10 μm) that underwent more than one cycle 360° rotation in a counterclockwise direction. In each cycle, the particle returns to the same set of orientations. The spin rotational motion occurs about a small circle of radius of 9 μm. We controlled spin rotation of the cylindrical lens 32 with an embodiment of the optical trap 10A' in FIG. 3A having the cylindrical lens 32 mounted on the rotational stage 36 so that the cylindrical lens 32 rotates. We tried angular speeds of the stage 36 ranging from 1-8 degrees per second. The trapped spinning particle was spinning at 2 degrees per second. We found that when the trapped spinning particle directly matches the speed of the cylindrical lens 32, the particle underwent exactly 360 degrees of motion for every 360-degree rotation of the cylindrical lens 32. When the cylindrical lens returns to the same set of orientations, so does the particle. This rotation can be stopped or paused at any point for further analysis by halting the motion of the lens 32.

We observed that during spin-rotational motion, the particle occasionally changed orientation with respect to the trapping-beam axis. Upon repeated rotation, this out-of-plane motion occurs at the same angular positions. Due to the irregular, three-dimensional shape of the particles, there will often be a preferred trapping orientation based on the balance of the trapping and gravitational forces. Since in this arrangement, the horizontal forces are not circularly symmetric, this orientation may change as the particle rotates. While our experiment optical trap is also capable of trapping non-absorbing particles, we had some difficulties trapping such particles of a suitable size to demonstrate rotation, as smaller (e.g., <10 μm) particles tend to undergo circular motion even at low laser power.

Figure 11:
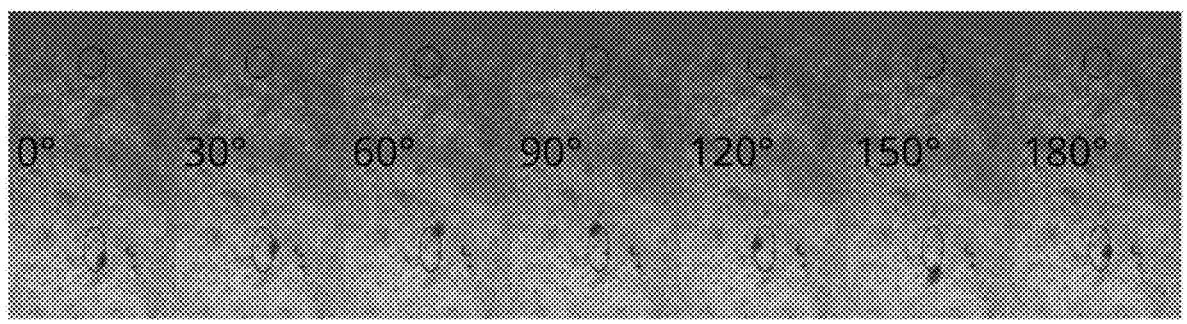
FIG. 11 is an image sequence of a small particle undergoing circular and elliptical motion in response to the rotation of the cylindrical lens at different laser powers.

In FIG. 11 we show an image sequence of a small, roughly 10-μm-diameter grain of calcite undergoing circular and elliptical motion in response to the rotation of the cylindrical lens 32 for two laser powers. In the high power case (i.e., 1.6 W), the motion was circular with radius of rotation of roughly 15 μm, while in the lower power case (i.e., 1.25 W), the motion was more elliptical or oval with axes of 10 and 21 μm. The circular or elliptical/oval marker shows the approximate path of the particle motion. The orientation of the cylindrical lens is shown between the top and bottom panels, as they are the same for each sequence. The motion of the calcite particle traced two circles or ellipses/ovals for each 360° rotation of the cylindrical lens. Interestingly, unlike the larger, more absorbing particles shown in FIG. 10, the calcite grain traces two full circles for each 360° rotation of the cylindrical lens, similar to the smaller particles shown in FIG. 9. Future work will focus on finding low density, transparent samples that can be stably trapped at larger sizes.

In our experiments, the particles can be held at any orientation for an extended period of time (minutes or longer) to conduct observations and measurements by stopping the cylindrical lens at a designated angle. Additionally, the rotation direction of the particle is directly controlled by the rotation direction of the cylindrical lens. Changes in the rotation direction of the particle shown in FIG. 10 occur in response to reversing the rotational direction of the cylindrical lens 32 in FIG. 3A. This active control of the orientation of a trapped airborne particle at any desired angle in relation to the illuminating laser and observation direction could benefit aerosol studies, for instance, in the measurement of its elastic light scattering, which depends on particle orientation with respect to the incident beam.

FIGS. 12A and 12B further demonstrate imaging and scattering of a trapped particle at different orientations using our optical trap. FIG. 12A shows an image sequence of the same particle used in the FIG. 10 in four different orientations (45°, 135°, 315° and) 225°, and FIG. 12B shows corresponding 2D scattering patterns. Therefore, detailed imaging and measuring of trapped particles can be made at various orientations thereof.

FIG. 13 shows elastic light scattering patterns of a carbon nanotube cluster in different orientations with the spherical coordinate axes labeled. The angular position of the cylindrical lens is given in the lower left of each panel and the corresponding image of the particle in each orientation is shown inset in the lower right of each panel.

As the above-described images show, we demonstrate a new and novel optical particle trapping for active, controlled circular and spin rotation of an optically trapped particle, by directing the rotation of the trapping conical beam around the propagation axis. In certain embodiments, the trapping and rotation configuration may consist of a circular, hollow beam shaped by a long focal length (e.g., fl=5000 mm) cylindrical lens into an elliptical shape. This elliptical hollow beam is then focused into an elliptic cone that creates an optical trap where the horizontal forces have bilateral symmetry but are stronger along one axis. When the elliptical hollow beam is rotated, using rotating means 35 (e.g., stage 36), the orientation of the axes changes, and the orientation of the trapped particle follows. We have demonstrated experimentally that the rotational behavior is highly influenced by the laser power and that the rate and direction of the particle rotation is tied to that of the optics and/or mechanics 30 (such as cylindrical lens 32). Such a technique for manipulating the orientation of trapped particles could be used to assist in airborne particle characterization by orientation-dependent properties, such as elastic light scattering, or allow a single particle to be moved within the sample chamber to be accessed by multiple analytical tools.

Embodiments of the innovative optical trap, such as traps discussed herein, may be used for various applications. For example, it may be used in a laboratory for in-vitro inspection and/or measurement of trapping particles. Or it may be incorporated into or combined other airborne handing systems.

Figure 14:
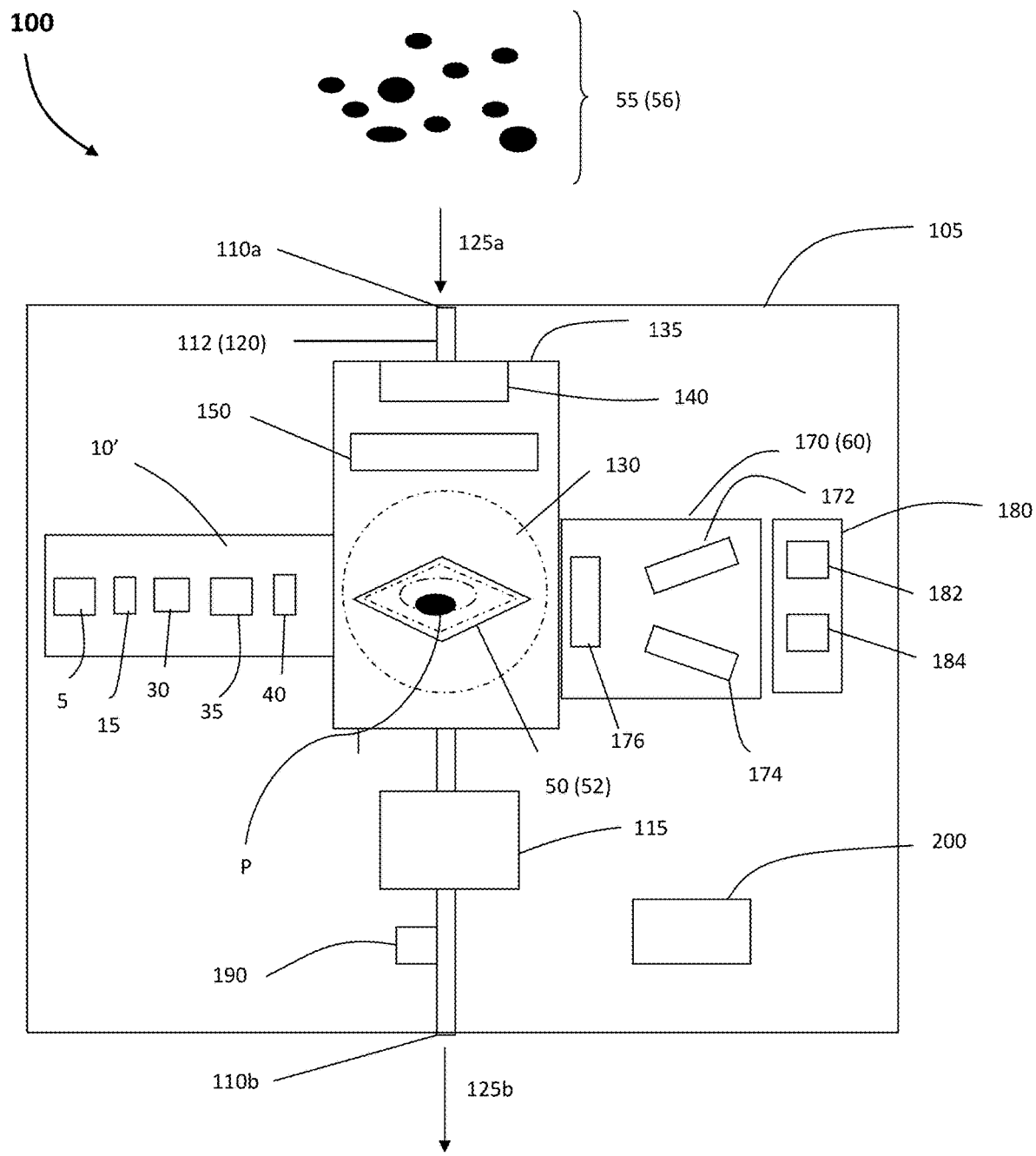
FIG. 14 is a schematic illustration of an example system for continuously sampling airborne particles according to an embodiment of the present invention.

FIG. 14 is a schematic illustration of an example system 100 for continuously sampling airborne particles according to an embodiment of the present invention. Various elements of the system 100 may be incorporated into a housing or other structure 105, thus forming a unitary apparatus. The housing 105 may also include an appropriate power supply, for instance. As such, the system, embodied as an apparatus, may provide a compact and portable device. In some embodiments, not all elements illustrated in the figure will be provided, and/or other elements may be provided. Additionally, it will be appreciated that the elements may be present or may be positioned in locations other than illustrated in this schematic.

Once inside the system 100, particles can be trapped and held using an embodiment of the optical particle trap 10' for which a few important components thereof are graphically depicted: light source 5, iris 15, optics and/or mechanics 30, rotating means 35, optical focusing element 40, trapping region 50, and containment cell 52. These components are described above.

The system 100 includes an airflow system 120 configured to draw one or more airborne particles 55 into a measurement volume 130. Inside the sampling volume 130 there is the trapping region 50. Particles within this trapping region 50 can be trapped and held for imaging and/or measuring, as explained later. The trapping region 50 may be defined by the glass containment cell 52 with suitable orifices for entering/existing particles and airflows.

The optical trap 10' is located within a sampling volume 130 of the system 100. For instance, in an embodiment, the sampling volume 130 and the trapping region 50 may be substantially the same size and overlap in a location within the system. In other embodiments, the trapping region 50 could be made relatively large and the sampling volume could be made small, and the air could be directed toward the optical trap 10'. That arrangement may increase the fraction of particles, drawn into the device, that are caught in the trap, which can be beneficial for situations where the particles have been pre-selected in some way, or are expensive or hard to obtain.

Other measurements of properties (such as temperature, humidity, density, etc.) of the air drawn into the sampling volume 130, and/or of airborne particles 55 drawn into the sampling volume 130, and/or of the flow rate of the air drawn into the sampling volume 130 may be measured. Additional measurement(s) of particles 55, not requiring trapping individual particles P, may also be measured in the sampling volume 130. Other configurations of the sampling volume 130 are also possible.

Particles 55 may be suspended in a gaseous medium 56 of air, typically atmospheric air, or some other gas. In various implementations and uses, the particles may include, e.g., solid, liquid, gel, and/or mixtures of these dispersed in a gas, which may be consistent with the usual and customary definitions of aerosol particles. The system may be configured so that all the particles 55 drawn into the system pass through the trapping region 50, or it may be configured so that only a fraction of the particles are drawn through the trapping region 50. While a particle P is held in the trapping region 50 of the optical trap 10', airflow may continue substantially unabated through the trap 10', around the trap 10', or some combination thereof.

The airflow system 120 creates a flow of air 125. The incoming airflow 125a (to the system 100) flows into an inlet 110a and then to the sampling volume 130. The outgoing airflow 125b (from the system 100) flows via an outlet 110b to the ambient environment. A filter and/or grating (not shown) may be provided at the inlet 110a, if desired, to prevent particles larger than a predetermined size from entering the system. Passage 112 may provide fluid connection for airflow 125 through the system 100. A fluid mover 115 may be provided which creates sufficient force (e.g., negative pressure) to move the airflow 125 into and through the system 100. For example, the fluid mover 115 may be a pump, a fan, a compressor, a blower, a corona-generated ion wind, etc. To avoid violent or turbulent flow, the fluid mover 115 may be operated to ensure the flow rate of airflow 125 is laminar with a steady flow rate. To avoid large drag forces on particles, the airflow rates will typically be less than 1 m/s, and may be less than 1 cm/s. Lower airflow and particle velocities allow particles to be trapped with lower requirements for trapping laser power, for a given trap design. However, when the airflow rates are decreased, in order to reduce the requirements for trapping (such as, the trapping laser intensity), the sampling rate tends to decrease. While the fluid mover 115 is illustrated near the outlet 110b of the system 100, as it is a preferred embodiment because the particles do not need to pass through any fluid mover before they are measured. But, it will be appreciated that the fluid mover 115 can be located at another location in the airflow 125, such as, for example, near inlet 110a.

Inside the sampling volume 130, air and particles may pass through an optional particle concentrator 140 which increases the concentration or density of the particles in the airflow 125. The particle concentrator 140 may be a so-called "air-to-air" concentrator, for instance, for specifically processing particles in a gaseous medium.

A particle detector 150 is configured to detect a particle (or particles) approaching and/or within the sample volume 130. In one embodiment, the particle detector 150 may include one or more trigger beams. When a particle scatters light from the beam or beams, and this light is detected by one or more photodetectors, the signals from the photodetector or photodetectors indicate the presence of a particle either approaching and/or within the trapping region 50, depending upon the precise alignment of the trigger. As shown, the particle detector 150 is positioned somewhere upstream of the trapping region 50. But, in other embodiments, trigger beams of the particle detector 150 could overlap with the sampling volume 130 and/or the trapping region 50. For example, the particle detector 150 may be comprised of two different-wavelength crossed-beam diode lasers with corresponding photodetectors, each of said photodetectors including an optical filter that passes the wavelength of the diode laser it detects and blocks the light from the other diode laser and light at any other wavelengths that would interfere. One crossed diode trigger laser system which may be used as a particle detector 150 is described, for example, in U.S. Pat. No. 6,947,134, herein incorporated by reference. Of course, other trigger beam systems and devices might also be used for detection a particle. For detection of a particle within (not approaching) the trapping region, the particle detector 150 could at least partially overlap the trapping region 50 in the schematic drawing. Detector 150 also can be used to determine particle speed and size as an example.

The optical trap 10' generates light forces which trap an airborne particle and holds it. The light forces may be generated by the light source 5 (like a laser), are shaped by the iris 15, optics and/or mechanics 30 to form and shape the orienting hollow beam OHB (whether directly or indirectly), rotating means 35, and optical focusing element 40 for focusing the orienting hollow beam FOHB into the trapping region 50. The window 53 enables inspection and/or measurement into the trapping region 50. No mirror is shown here, but the optional mirror 25 could be positioned in the beam path as shown in FIG. 3A in some embodiments for a more compact system.

The optical trap 10' may operate as follows: 1) the trapping light source 5 (e.g., laser 6) is gated off (or turned "off", or modulated to a relatively low intensity, or blocked) for a short time (e.g., 1 ms) to let any trapped particle (typically as soon as the measurement of the trapped particle is completed) out of the trapping region 50, and to let new particles into the trapping region 50; 2) the trapping laser 6 is gated on (or turned "on", or modulated to be at a higher intensity) to trap any particle that is in the trapping region 50. The optics and/or mechanics 30 can be rotated.

After completion of the measurement(s), the process may be repeated, and in a typical embodiment is repeated continuously as soon as a particle is trapped and its desired properties have been measured. This approach may provide a less expensive, system by eliminating the separate trigger lasers and their associated photodetectors, filters, lenses and holders for this subsystem. The laser can also remain on at all times to trap one or a few representative particles for study and measurement, similar to the operating mode used in most conventional laser tweezer systems.

Optical forces generated by the optical trap 10' will tend to urge the particle P toward a focal point of the focused beam in the trapping region 50 of the optical trap 10; thus, the volume in which the particle is held during measurement of it optical properties is typically much smaller than the trapping region 50. Ideally, the trapping region 50 is sized and configured to trap and hold one individual particle P at a time from the airflow 125. It is noted that this is the expected performance of the optical trap 10'.

However, there may be circumstances (e.g., relatively high concentrations of particles 50 in the inlet air) in which more than one particle might be trapped and held. This is a result of the typical substantially random distribution of particles in air. But the probability of trapping and holding two or more particles (e.g. greater than 0.5 micrometer) at once is likely to be very low (e.g., less than 1% of the time) if the average concentration of particles in air is low enough that only one particle is in the trapping region at any time. For instance, the particle concentration could be diluted by combining the inlet air with clean air, without any concentrator 140, at low inlet flow rate, or even by enclosing the inlet airflow within a clean air sheath. In any event, the optical trap 10' can be configured to trap and hold about one particle for measurement(s) thereof (i.e., where the vast majority of the measurements are of a single individual particle, and only some small fraction of the measurements are of two or more particles with sizes greater than some minimum diameter, e.g., 0.6 micrometer).

For some applications, embodiments that measure average spectra for multiple particles may be adequate, and in fact desired, for example, because the measurements could be made more quickly. For example, in monitoring the smoke particles from a fire, or the exhaust from an engine, trapping many particles at once, can provide a way to rapidly provide the average spectra of the particles, which may be desirable because, for example, such particles may change rapidly as the engine or fire parameters vary.

The light source 5 is actuated (i.e., turned-on) or unblocked (or gated-on) or modulated to a higher intensity, for example, at an appropriate time to trap a particle. Various methods may be used to control the light beam LB that generates the optical trap 10'. If the light source 5 is a diode laser that can be controlled by varying its drive current, then the beam amplitude (and trap) can be controlled by varying the drive current. And if the laser is one where the amplitude cannot be directly controlled sufficiently rapidly using fast electronics then other modulators or shutters could be used. For example, a separate blocking or modulating element (not shown) may be provided in various embodiments. This blocking or modulating element may be configured to be actuated so as to block the laser beam from reaching the trapping region 50. The blocking element could include, for instance, an acousto-optic modulator (AOM), electro-optic modulator (EOM), a motor-driven mechanical shutter, or a piezoelectric-driven shutter.

While a particle P is trapped and held in the optical trap 10', one or more properties of that trapped particle P may be measured or otherwise made. A measurement device 170 (as the imaging and/or measuring system 60) thus is configured to measure at least one property of the trapped particle P while it is held in the optical particle trap 10'. These measurements may include, for example, Raman, fluorescence, thermal emission, laser-induced breakdown spectroscopy (LIBS), spark-induced breakdown spectroscopy (SIBS), image, particle morphology, elastic scattering over one, a few or many angles or wavelengths. The Raman, fluorescence, thermal emission, LIBS and SIBS may each be measured at one or more emission bands, including the case of sufficient bands to be considered a spectrum. The foregoing list is not exhaustive and other measurement techniques may be used. Devices for performing such measurements are generally known and will not be described in greater detail.

In one or more embodiments, Raman spectra (or Raman emission in one to several bands) of a trapped particle may be measured. Raman spectra provide information on the vibrational and rotational energy levels of molecules. These spectra can serve as "fingerprints" for various pure materials such as chemical warfare (CW) agent droplets, and may serve as fingerprints for some complex particles such as biological warfare (BW) aerosols prepared in certain ways, or certain species of fungal spores, etc. For these more complex particles such as those made from bacteria, the spectra tend to become more difficult to differentiate from spectra of similar bacteria grown under various conditions. More particularly, Raman spectral measurements may include, for example, Raman scattering, Raman spectroscopy, Resonance Raman spectroscopy, Coherent anti-stokes Raman scattering (CARS), and surface enhanced Raman scattering (SERS), which could be measured, for example, if the particles are combined with a droplet containing colloidal silver or gold nanoparticles before measurement).

Raman spectra may provide more information regarding the chemical and/or biochemical composition of individual airborne particles than can be obtained using ultraviolet laser-induced fluorescence (UV-LIF) even when the UV-LIF is combined with elastic scattering. According to one embodiment, the system may measure Raman spectra of particles at rates of 10's per minute to a few per second, depending upon the particle sizes, absorption coefficients, Raman cross sections, and concentrations of particles in air, etc. In general, Raman emission is generated when electromagnetic energy (light) excites the molecular bonds within a material. This excitation light generates a spectrum of light that has a different (e.g., typically longer) wavelength than the wavelength of the excitation light. The Raman emission spectra are usually characteristic of the material and generally exhibit peaks at wavelengths which depend upon the excitation wavelength(s) and the frequencies of vibrational and/or rotational modes of the molecular bonds in the material.

At least one detector 172 may be included in the measurement device 170 for particle measurements. Typically, in operation, only a fraction of the particles entering the system may be measured (although such operation is not limiting). The detector 172 can vary depending on which property of the trapped particle P is to be measured. General detectors and/or specific detectors may be used, for instance. In some embodiments, the detector 172 may include a spectrograph and the sensors.

Depending on the measurement desired, an excitation source may be required generate energy which can produce emissions and/or another phenomenon by the trapped particle P. In some embodiments, the same laser 6 that is used to trap the particle P may also be used to generate the excitation energy which causes the trapped particle P to generate the emissions and/or another phenomenon which is to be detected by the detector 172. For example, a portion of the beam of laser 6 may be split off from the rest of the beam (e.g., with a mirror, beamsplitter and/or other optics), manipulated and directed via optics to the trapped particle P.

In other embodiments, increased flexibility in trapping and measuring can be obtained by using one or more separate excitation sources 174. These sources, such as a laser, may be provided in the measuring device 170 that are configured to excite emissions of the trapped particle. As such, the trapping laser 6 need not be used in the measuring process. The excitation sources 174 may be operated at a different wavelength and/or other parameters than the trapping laser 6. For example, in some embodiments, the excitation sources may be focused tightly or weakly, depending on the application or mode of operation.

Collection optics 176 may further be included for manipulating emission and/or phenomenon to be measured by detector 172. These optics generally include some signal collection optics such as a lens, an objective, an elliptical mirror and a spherical mirror, and can use the same optics that form the trap. As an example of the elliptical mirror, the aerosol particle will be trapped at one of the focal points of the elliptical mirror, which has been positioned to coincide with the center of the spherical mirror. Therefore, light that reaches the spherical mirror from the particle is reflected back to the center of the mirror and towards the elliptical mirror, while light that reaches the elliptical mirror either directly from the particle or reflected from the spherical mirror is reflected to the second focal point of the elliptical mirror. This second focal point overlaps with the entrance of the spectrometer. This configuration enables collection of a large solid angle (e.g., greater than $2\pi$ or even $3\pi$ sr) of the Raman spectral emission from single particles, and it focuses the emission into a small angle to match the f-number of the Raman spectrometer.

A particle analyzer 180 is configured to analyze the measurement data. More particularly, the analyzer 180 may rapidly identify, determine, classify, characterize and/or sort, particles according to their measured properties. In some embodiments, it may determine, from at least one measured property, a parameter related to the trapped particle P. This may include determining from the measurements one or more parameters related to particle shape, size, refractive index, absorption, Raman cross section or any combination thereof of the trapped particle, for example. Parameters may be determined or otherwise computed from measured data. For instance, extracting the size, shape and refractive index of a particle from angular scattering measurements requires solving an inverse problem, or at least finding an approximation to that solution.

The particle analyzer 180 may be configured to monitor measurement data for potentially harmful particles such as bacteria, bacterial spores, pollens, fungal spores, protein allergens, smoke particles, and pollutants, such as pollutant particles that contain polycyclic aromatic hydrocarbons or reactive oxygenated species. A database (not shown) of known threats may be searched and/or analyzed with respect to measurement data, for example. Also, past measurements may be stored for further analysis and/or future searching.

In some instances, the particle analyzer 180 may be used to count and classify particles which can be used to determine or estimate exposures of persons to various airborne chemicals and pollutants, such as, for example, smoke from fires or burn-pits, or to diesel exhaust. The particle analyzer 180 may be a computer or microprocessor, for instance, which is configured to execute an algorithm 182 that is used to identify and or classify particles based on their measured properties, preferably in real time. The different categories can correspond to one or more different pollens, bacteria, bacterial spores, allergens or any other classification scheme. In some embodiments, the near-real-time algorithm used to classify particles into categories will be similar to those described in papers by R.G. Pinnick et al, "Fluorescence spectra of atmospheric aerosol at Adelphi, Maryland, USA: measurement and classification of single particles containing organic carbon," Atmos. Environ., 38, 657-1672 (2004); and by Y. L. Pan et al, "Single-particle laser-induced fluorescence spectra of biological and other organic-carbon aerosols in the atmosphere: measurements at New Haven, Connecticut, and Las Cruces, New Mexico," J. Geophys. Res., 112, D24S19, 1-15 (2007), each of which is herein incorporated by reference. In other embodiments, the near-real-time algorithm used to sort particles into categories may be the one described by Y. L. Pan et al, "Fluorescence spectra of atmospheric aerosol particles measured using one or two excitation wavelengths: Comparison of classification schemes employing different emission and scattering results," Optics Express, 18 (12), 12436-12457 (2010), herein incorporated by reference. Of course, for the case of Raman spectra the algorithms may be the same or similar, but the actual spectral shapes for the different particle categories are very different, and generally will have higher information content. Again, for the case of thermal emission the algorithms may be the same as or similar to those described above, but the actual spectral shapes and spectral features that are used in the algorithms are different.

Additionally, the particle analyzer 180 may be coupled to a warning detector 184 that is configured to provide a warning when particles consistent with expected or known biological or chemical agents are detected. This may be instrumental, for instance, in the case of an attack with aerosolized biowarfare or chemical warfare agents by indicating a potential attack, so that personnel can begin to take protective actions. The warning detector 184 may include an audible alarm or siren, flashing (strobe) light, display screen, etc. which can provide audible and/or visual warnings. In some instances, written instructions may be provided by the display screen or printer for the aid of personnel. If the system is connected to a network (e.g., phone, internet, intranet, etc.) it may generate messages to contact first responders or other emergency personnel, command personnel and/or other persons, as desired.

A particle sorter 190 can physically sort, and optionally store, particles based on their measured properties. One particle sorting system which may be used with embodiments of the present invention is disclosed, for example, in U.S. Pat. No. 7,410,063, herein incorporated by reference. In other embodiments, once it is determined that a trapped particle should be collected and stored for further analysis, the air surrounding the particle is drawn though a filter (e.g., glass fiber, or filter with small holes (e.g., a nucleopore, or Millipore filter) by opening a valve connected to a vacuum or by turning on an air pump, and then catching the particle on the filter as the air it is entrained in is drawn through the filter.

A controller 200 is provided which is configured to the various control operations of the system 100, preferably in a fully-automated manner so that the system can trap a particle from air, hold it for as long as needed to measure its Raman spectrum or other properties as appropriate, then release the particle once the measurement(s) are completed, and then continuously repeat these steps (trap, measure, release). The controller 200 may be a computer or microprocessor, for instance, that includes computer-executable code which when executed is configured to implement methods for continuously sampling particles from air.

The controller 200 may be configured to generate and send signals to the various elements described herein, for instance, causing the elements to function or be otherwise actuated/deactivated upon command. This may include generating signals to: trap a particle in the sampling volume and hold the trapped particle; measure a property of the trapped particle; and release the trapped particle. The aforementioned sequence may be repeated as many times as desired.

It may also control SLMs 33, 34 (see FIG. 3B and FIG. 3C), if present, to generate holographic images and rotate the image on those devices.

Operation of the system 100 may vary depending on the particle detector 150, as discussed above. For example, in one embodiment, the controller 200 may generate a signal to actuate the optical trap 10' to trap the particle in the sampling volume 130 based on a detection signal received from the particle detector 150. Or, in another embodiment, the controller 200 may generate a signal to cause the measuring device 170 to measure a property of a trapped particle P already trapped in the optical trap 10' based on a detection signal received from the particle detector 150.

Once a particle is trapped by the optical trap 10', depending on the desired operation, controller 200 may ensure that it is held for sufficient time in order to: a) make one or more measurements of the same particle using different techniques; b) make improved measurements because the particle location can be better defined; and c) make measurements of dynamic processes in a trapped particle, by repeatedly measuring the spectrum or other parameter to see how it changes with time. In one embodiment, the fluorescence spectra can be measured with higher resolution, and the angular optical scattering can be measured with far better knowledge of the position of the particle and of the angles of the measured scattering intensities. The resulting reduction in uncertainties in the measurements makes the inverse problem, to extract parameters relating to the shape, size or chemical composition, far more tractable. Other sampling methodologies may also be executed, and the aforementioned ones should not be thought of as exhaustive.

Aspects relating to this invention have been previously disclosed by the inventors in the following:

Jessica A. Arnold, Aimable Kalume, Chuji Wang, Gorden Videen, and Yong-Le Pan, "Active, controlled circular, and spin-rotational movement of optically trapped airborne micro-particles," Optics Letters, Vol. 46, Issue 21, pp. 5332-5335 (2021), herein incorporated by reference in its entirety for all purposes; and Jessica Arnold, Aimable Kalume, Gorden Videen, Yong-Le Pan, Chuji Wang, Presentation titled "Methods for Optical Trapping and Active Orientation Control of Airborne Microparticles," American Association for Aerosol Research 2021 conference, Oct. 20, 2021, herein incorporated by reference in its entirety for all purposes.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. An optical trap for trapping and holding airborne particles comprising:
    a light source for generating a beam of light;
    a spatial light modulator (SLM) configured to generate a computer-generated hologram (CGH) of an orienting hollow beam having unequal axisymmetry in two orthogonal directions in a plane with a substantially hollow ring geometry cross-section and no angular momentum;
    an optical focusing element for focusing the orienting hollow beam to a single focal point;
    a trapping region where an airborne particle can be present to be trapped and held at or near the single focal point of the focused optical focusing element; and
    an imaging and/or measuring system configured to image and/or measure particles in the trapping region,
    wherein the SLM is programmed to rotate the CGH, or the SLM is mounted on a rotating stage, such that the orienting hollow beam can rotate about a fixed axis normal to the beam propagating direction to the trapping region, in order to rotate the trapped airborne particle at or near the single focal point of the focusing the orienting hollow beam.

2. The optical trap of claim 1, further comprising optics and/or mechanics for forming and shaping the beam of light.

3. The optical trap of claim 2, wherein the optics and/or mechanics for forming and shaping the beam of light comprises a first means for forming shaping an intermediate beam from the beam of light, and the CGH generated by the SLM forms and shapes the orienting hollow beam from the intermediate beam.

4. The optical trap of claim 3, wherein the intermediate beam comprises a cylindrical hollow beam and the orienting hollow beam comprises an elliptical hollow beam.

5. The optical trap of claim 3, wherein the first means for forming shaping the intermediate beam from the beam of light comprises holography means, spatial light modulators, phase and amplitude masks, biaxial crystals, diffraction pattern, aberration of optical components, an interference pattern of coherent light source or a pair of axicon lens.

6. The optical trap of claim 1, wherein the forms and shapes the orienting hollow beam directly from the beam of light.

7. The optical trap of claim 1, wherein the CGH is programmed to rotate, or the rotating stage is configured to rotate, the orienting hollow beam at an angular speed between 1-8 degrees per second.

8. The optical trap of claim 1, wherein the CGH is programmed to, or the rotating means is configured to, (i) start rotating in order to impart rotation to a trapped particle; (ii) change speed in order to alter the rotation of a trapped particle; (iii) stop or pause rotation in order to hold a trapped particle at a given angular orientation; and (iv) reverse the direction of rotation to change the rotational direction of a trapped particle.

9. The optical trap of claim 1, wherein the optical trap is configured to provide a spin-rotational motion to a trapped particle at laser power level less than about 1.5 W and a circular-rotational motion to a trapped particle at laser power greater than about 1.5 W.

10. The optical trap of claim 1, wherein the optical focusing element comprises a lens, a parabolic reflector or a microscopic objective.

11. The optical trap of claim 1, wherein the light source comprises a laser, a light emitting diode (LED), or other light source with a narrow wavelength band or a broad wavelength band either in continuous wave (CW) or pulsed output beam.

12. The optical trap of claim 1, further comprising: a controller configured to control the trapping and holding of particles, wherein the controller is configured to generate signals to:
- deliver one or more airborne particles to the trapping region;
- trap one or more airborne particles in the trapping region;
- image and/or measure one or more properties of the one or more trapped airborne particles; and
- release the one or more trapped airborne particles.

13. The optical trap of claim 1, further comprising: a particle detector configured to detect an airborne particle approaching and/or within the trapping region of the optical trap.

14. The optical trap of claim 1, wherein the measuring system is configured to measure one or more of: imaging, Raman scattering spectra, Raman emission in one or more wavelength bands, laser-induced breakdown emission in one or more wavelength bands, laser-induced breakdown spectra, spark-induced breakdown emission in one or more wavelength bands, spark-induced breakdown spectra, fluorescence in one or more wavelength bands, fluorescence spectra, multi-photon excited fluorescence, thermal emission at one or more wavelengths, thermal emission spectra, light scattering over one or more angles, light scattering at multiple wavelengths, absorption spectra of the particle, particle size and shape, cavity ringdown spectroscopy, and photoacoustic absorption spectra.

15. A method for continuously sampling particles from air using the optical trap of claim 1, the method comprising:
- delivering air including airborne particles toward a trapping region;
- trapping one or more airborne particles in the optical trap;
- imaging and/or measuring a property of the trapped one or more airborne particles; and
- releasing the trapped one or more airborne particles.

16. The method of claim 15, further comprising:
- rotating the one or more trapped airborne particles to a first orientation; and
- subsequently rotating the one or more trapped airborne particles to a second orientation.

17. The method of claim 15, further comprising: determining from the measured property a parameter related to particle shape, size, internal structure, surface texture, refractive index, absorption, orientation, molecular structures and compositions, chemical reactions, or any combination thereof of the trapped one or more airborne particles.

18. The optical trap of claim 1, wherein the optical focusing element has a numerical aperture of approximately 0.55.

19. The optical trap of claim 1, further comprising the rotating stage which the SLM is mounted.

20. The optical trap of claim 1, wherein the imaging system comprises a charged-couple device or camera for capturing still images and video footage.

21. An optical trap for trapping and holding airborne particles comprising:
- a light source for generating a beam of light;
- optics for shaping and forming a circular hollow beam having a circular ring geometry from the beam of light;
- a cylindrical lens for further shaping and forming the circular hollow beam into an elliptical hollow beam having an elliptical ring geometry, the cylindrical lens having a focal length of 5000 mm or longer;
- a rotation stage which supports and rotates the cylindrical lens in a controlled manner;
- an optical focusing element for focusing the elliptical hollow beam into a hollow elliptical cone;
- a trapping region where an airborne particle can be present to be trapped and held at or near a focal point of the hollow elliptical cone; and
- an imaging and/or measuring system configured to image and/or measure particles in the trapping region.

22. The optical trap of claim 21, wherein the cylindrical lens has a focal length of 1000 cm.

23. The optical trap of claim 21, wherein the imaging system comprises a charged-couple device or camera for capturing still images and video footage.

* * * * *